US012315468B2

(12) United States Patent
Nakamura

(10) Patent No.: US 12,315,468 B2
(45) Date of Patent: May 27, 2025

(54) DISPLAY DEVICE AND DISPLAY METHOD

(71) Applicant: SHARP KABUSHIKI KAISHA, Sakai (JP)

(72) Inventor: Tatsunori Nakamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 212 days.

(21) Appl. No.: 18/095,789

(22) Filed: Jan. 11, 2023

(65) Prior Publication Data

US 2023/0298535 A1 Sep. 21, 2023

Related U.S. Application Data

(60) Provisional application No. 63/309,764, filed on Feb. 14, 2022.

(51) Int. Cl.
*G09G 3/36* (2006.01)
*G02F 1/13* (2006.01)
*G09G 3/20* (2006.01)
*G09G 3/34* (2006.01)

(52) U.S. Cl.
CPC ............. *G09G 3/36* (2013.01); *G09G 3/2074* (2013.01); *G09G 3/3426* (2013.01); *G09G 2300/023* (2013.01); *G09G 2320/0233* (2013.01); *G09G 2320/066* (2013.01); *G09G 2340/045* (2013.01); *G09G 2340/0485* (2013.01); *G09G 2354/00* (2013.01)

(58) Field of Classification Search
CPC ...... G09G 3/36; G09G 3/3426; G09G 3/2074; G09G 3/3413; G09G 2320/028; G09G 2320/023; G09G 2320/0485; G09G 2320/066; G09G 2320/045; G09G 2320/0233; G09G 2354/00; G09G 2320/0646; G09G 3/3611; G09G 3/3607; G09G 5/06; G09G 2320/0285; G09G 2320/0209; G09G 2320/0276; G02F 1/133308–13336; G02F 1/133317
See application file for complete search history.

(56) References Cited

U.S. PATENT DOCUMENTS

| | | | | |
|---|---|---|---|---|
| 7,937,122 | B2 * | 5/2011 | Hamamura | H04M 1/0245 455/566 |
| 8,451,201 | B2 * | 5/2013 | Hirata | G02F 1/13471 349/110 |
| 9,726,948 | B2 * | 8/2017 | Fukuoka | G09G 3/36 |
| 10,036,911 | B2 * | 7/2018 | Cho | G02F 1/133308 |
| 10,440,207 | B2 * | 10/2019 | Sensu | G06F 3/04847 |
| 11,216,138 | B2 * | 1/2022 | Yamazaki | G06F 3/147 |

(Continued)

FOREIGN PATENT DOCUMENTS

JP 2019-174742 A 10/2019

*Primary Examiner* — Wesner Sajous
(74) *Attorney, Agent, or Firm* — ScienBiziP, P.C.

(57) ABSTRACT

The display device includes a first liquid crystal panel that displays a first image, a second liquid crystal panel that faces a rear surface of the first liquid crystal panel and displays a second image synchronized with the first image, and an image enlargement processing unit configured to generate the second image to be displayed on the second liquid crystal panel by enlargement from a predetermined enlargement center position toward at least one end portion of the second liquid crystal panel.

8 Claims, 29 Drawing Sheets

(56) References Cited

U.S. PATENT DOCUMENTS

| | | | | |
|---|---|---|---|---|
| 2020/0126510 A1* | 4/2020 | Shiokawa | G09G 5/003 |
| 2020/0175934 A1* | 6/2020 | Hirotsune | G09G 5/028 |
| 2021/0035511 A1* | 2/2021 | Kimura | G09G 3/36 |
| 2023/0145390 A1* | 5/2023 | Nakamura | G06F 3/1431 345/87 |

* cited by examiner

| | | | | | | |
|---|---|---|---|---|---|---|
| 0.0 | 0.0 | 0.0 | 0.1 | 0.0 | 0.0 | 0.0 |
| 0.0 | 0.1 | 0.5 | 0.7 | 0.5 | 0.1 | 0.0 |
| 0.0 | 0.5 | 1.0 | 1.0 | 1.0 | 0.5 | 0.0 |
| 0.1 | 0.7 | 1.0 | 1.0 | 1.0 | 0.7 | 0.1 |
| 0.0 | 0.5 | 1.0 | 1.0 | 1.0 | 0.5 | 0.0 |
| 0.0 | 0.1 | 0.5 | 0.7 | 0.5 | 0.1 | 0.0 |
| 0.0 | 0.0 | 0.0 | 0.1 | 0.0 | 0.0 | 0.0 |

FIG. 3

DISPLAY DEVICE AND DISPLAY METHOD

CROSS-REFERENCE TO RELATED APPLICATION

The present application claims priority from Application No. 63/309,764, the content to which is hereby incorporated by reference into this application.

BACKGROUND

1. Field

The disclosure relates to a display device and a display method.

2. Description of the Related Art

JP 2019-174742 A discloses a liquid crystal display device in which two liquid crystal panels overlap each other to improve contrast. In the liquid crystal display device of JP 2019-174742 A, in a liquid crystal panel disposed on a rear surface of the two liquid crystal panels, a circular region having a radius corresponding to a width of seven pixels centered on one pixel is defined as a filter size, and the maximum luminance value of the pixels is set to the luminance of the pixels included in the filter size. JP 2019-174742 A describes that as a result, a desired image is visually recognized with little image deviation even in a case where a user sees a display screen from a diagonal direction.

SUMMARY

However, in the liquid crystal display device of JP 2019-174742 A, the liquid crystal panel on the rear surface extends the luminance of the surrounding pixels centered on one pixel uniformly, and thus there may occur a case where a radius of a circular region whose luminance is extended in the liquid crystal panel on the rear surface becomes too large, as compared to the liquid crystal panel on the front surface. When the radius of the circular region whose luminance is extended becomes too large in this way, contrast of an image to be visually recognized by a user and in which an image displayed on the liquid crystal panel on the front surface and an image displayed on the liquid crystal panel on the rear surface overlap each other, may be reduced to be visually recognized by the user. One aspect of the disclosure is directed towards suppressing reduction in contrast in a display device including a plurality of liquid crystal panels that overlap each other.

A display device according to an aspect of the disclosure includes a first liquid crystal panel configured to display a first image, a second liquid crystal panel facing a rear surface of the first liquid crystal panel and configured to display a second image synchronized with the first image, and an image enlargement processing unit configured to generate the second image to be displayed on the second liquid crystal panel by enlargement from a predetermined enlargement center position toward at least one end portion of the second liquid crystal panel.

A display method according to an aspect of the disclosure includes displaying a first image on a first liquid crystal panel, displaying a second image synchronized with the first image on a second liquid crystal panel facing a rear surface of the first liquid crystal panel, generating the second image by enlargement from a predetermined enlargement center position in the second liquid crystal panel toward at least one end portion of the second liquid crystal panel.

BRIEF DESCRIPTION OF DRAWINGS

FIG. 3 is a diagram illustrating an example of a filter coefficient used by a second liquid crystal panel extension processing unit according to the first embodiment.

DETAILED DESCRIPTION

Figure 1:
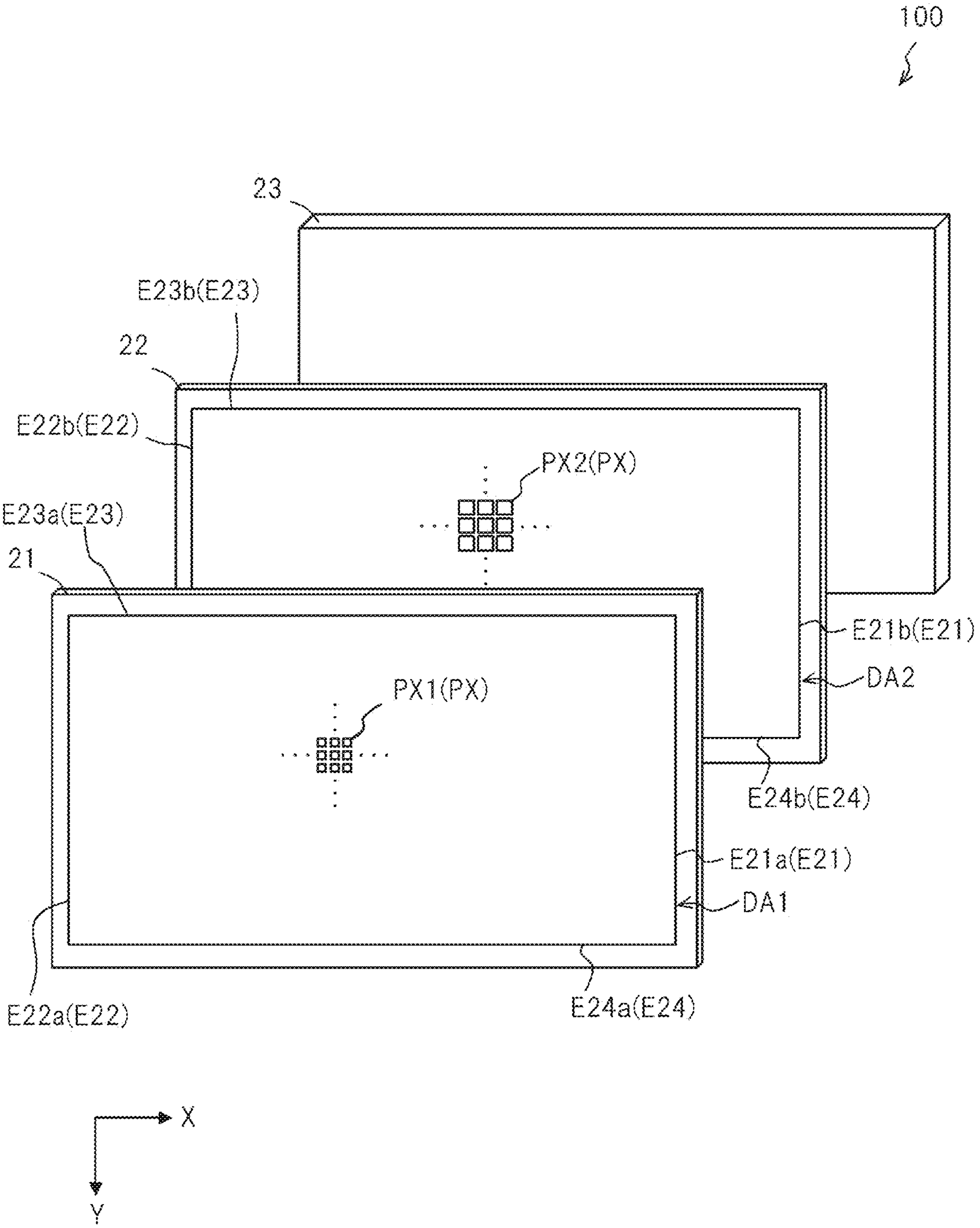
FIG. 1 is an exploded perspective view illustrating a schematic configuration of a liquid crystal display device according to a first embodiment.

Hereinafter, liquid crystal display devices according to embodiments of the disclosure will be described with reference to drawings. Note that, in the drawings, the same or equivalent elements are denoted by the same reference numerals and signs, and duplicating descriptions thereof will not be repeated.

Embodiments

FIG. 1 is an exploded perspective view illustrating a schematic configuration of a liquid crystal display device 100 according to a first embodiment. As illustrated in FIG. 1, the liquid crystal display device 100 includes a first liquid crystal panel 21, a second liquid crystal panel 22, and a backlight 23. Note that the liquid crystal display device 100 further includes a liquid crystal panel processing unit 40 and the like, as described below with reference to FIG. 2 and the like.

The first liquid crystal panel 21, the second liquid crystal panel 22, and the backlight 23 are arranged in this order from a front surface side to a rear surface side in the liquid crystal display device 100 and overlap each other. The first liquid crystal panel 21 and the second liquid crystal panel 22 overlap each other, which are a so-called dual liquid crystal panel. The first liquid crystal panel 21 overlaps a front surface of the second liquid crystal panel 22 to be disposed thereon and is a front panel that displays a first image (described below). The second liquid crystal panel 22 is a back panel provided between the first liquid crystal panel 21 and the backlight 23 to face a rear surface of the first liquid crystal panel 21. The second liquid crystal panel 22 displays a second image (described below) synchronized with the first image. The backlight 23 faces a rear surface of the second liquid crystal panel 22, that is, it is provided on a side opposite to the first liquid crystal panel 21 with respect to the second liquid crystal panel 22.

The backlight 23 has, for example, a plurality of light sources, illuminates the second liquid crystal panel 22 from the rear surface side, and illuminates the first liquid crystal panel 21 from the rear surface side through the second liquid crystal panel 22. The backlight 23 controls luminance of the plurality of light sources in accordance with luminance of the first image displayed on the first liquid crystal panel 21 and the second image displayed on the second liquid crystal panel 22 to be expressed. As the plurality of light sources included in the backlight 23, for example, a plurality of light emitting diodes (LEDs) that emit light such as white light can be used. A quantity of light of each LED is controlled by a drive circuit (not illustrated).

The first liquid crystal panel 21 includes a plurality of pixels PX1 provided in a matrix in a display region DA1 in which the first image is displayed. The second liquid crystal panel 22 includes a plurality of pixels PX2 provided in a matrix in a display region DA2 in which the second image is displayed.

The display region DA1 in the first liquid crystal panel 21 has, for example, a rectangular shape, and is a region surrounded by an end portion E21*a* at the right end, an end portion E22*a* at the left end, an end portion E23*a* on the upper side, and an end portion E24*a* on the lower side, when viewed toward the display region DA1. The display region DA2 in the second liquid crystal panel 22 has, for example, a rectangular shape, and is a region surrounded by an end portion E21*b* at the right end, an end portion E22*b* at the left end, an end portion E23*b* on the upper side, and an end portion E24*b* on the lower side, when viewed toward the display region DA2. Note that in a case where the end portion E21*a* and the end portion E21*b* are not distinguished from each other, the end portions are each referred to as an end portion E21, in a case where the end portion E22*a* and the end portion E22*b* are not distinguished from each other, the end portions are each referred to as an end portion E22, in a case where the end portion E23*a* and the end portion E23*b* are not distinguished from each other, the end portions are each referred to as an end portion E23, and in a case where the end portion E24*a* and the end portion E24*b* are not distinguished from each other, the end portions are each referred to as an end portion E24. The shape of each of the display region DA1 and the display region DA2 is not limited to a rectangular shape and may be another shape.

In the second liquid crystal panel 22, transmittance of the plurality of pixels PX2 is controlled to control a quantity of light passing through the pixels PX2 from the backlight 23, the light being emitted from the rear surface, that is, control luminance of the pixels PX2. In the first liquid crystal panel 21, transmittance of the plurality of pixels PX1 is controlled to control a quantity of light passing through the pixels PX1, the light being emitted from the backlight 23 on the rear surface and passing through the second liquid crystal panel 22, that is, control luminance of the pixels PX1. This allows the first liquid crystal panel 21 and the second liquid crystal panel 22 to display a desired image having luminance visible by a user in the display region DA1 of the first liquid crystal panel 21. Note that, in a case where the pixels PX1 and the pixels PX2 do not need to be particularly distinguished from each other, the pixels are each simply referred to as a pixel PX.

Further, in the following description, when viewed toward the display region DA1 or the display region DA2, a direction from the end portion E22 on the left side to the end portion E21 on the right side is referred to as an X direction (or a plus X direction), and conversely, a direction from the end portion E21 on the right side to the end portion E22 on the left side is referred to as a −(minus) X direction. The plus-minus X direction is a so-called horizontal direction in the display. When viewed toward the display region DA1 or the display region DA2, a direction from the end portion E23 on the upper side to the end portion E24 on the lower side is referred to as a Y direction (or a plus Y direction), and conversely, a direction from the end portion E24 on the lower side to the end portion E23 on the upper side is referred to as a −(minus) Y direction. The plus-minus Y direction is a so-called vertical direction in the display.

Each of the first liquid crystal panel 21 and the second liquid crystal panel 22 may display a color image, but in the first embodiment, description will be given where the first liquid crystal panel 21 displays a color image and the second liquid crystal panel 22 displays a black-and-white image. For example, in the first liquid crystal panel 21, each pixel PX1 includes three subpixels being a subpixel that emits red light, a subpixel that emits green light, and a subpixel that emits blue light. As a result, the first liquid crystal panel 21 controls luminance of the subpixels. The second liquid crystal panel 22 can adjust brightness per pixel PX2 by taking the three subpixels as one pixel PX2.

Here, a slight gap is structurally generated between the first liquid crystal panel 21 and the second liquid crystal panel 22. Thus, for example, in a case where a pixel size of a front panel and a pixel size of a back panel are the same in a dual liquid crystal panel, when a user sees a displayed image from the front in a diagonal direction, the image is seen as if some pixels of the front panel are deficient with respect to pixels of the back panel, reducing the display quality.

Accordingly, from the perspective of improving the display quality of an image to be displayed, in the liquid crystal display device 100, an image display region of an image to be displayed on the second liquid crystal panel 22 is preferably larger than a corresponding image display region of an image to be displayed on the first liquid crystal panel 21. The image display region is, of the display regions DA1 and DA2, a region in which a pixel is open, that is, a region in which a pixel value of the pixel is greater than 0. In other words, the image display region is a region in which an image is actually displayed, of the display regions DA1 and DA2. Note that the display regions DA1 and DA2 are each a region in which an image can be displayed. As described above, by making the image display region of the second liquid crystal panel 22 larger than the image display region of the first liquid crystal panel 21, it is possible to suppress display of an image in which some pixels of the first liquid crystal panel 21 are deficient. Furthermore, although details will be described below, the liquid crystal display device 100 is also configured to suppress reduction in contrast of an image in which the first image displayed on the first liquid crystal panel 21 and the second image displayed on the second liquid crystal panel 22 overlap each other.

A resolution of the second liquid crystal panel 22 can be the same as or lower than a resolution of the first liquid crystal panel 21. By making the resolution of the second liquid crystal panel 22 lower than the resolution of the first liquid crystal panel 21, an opening ratio per pixel is increased, so that power consumption can be reduced.

Figure 2:
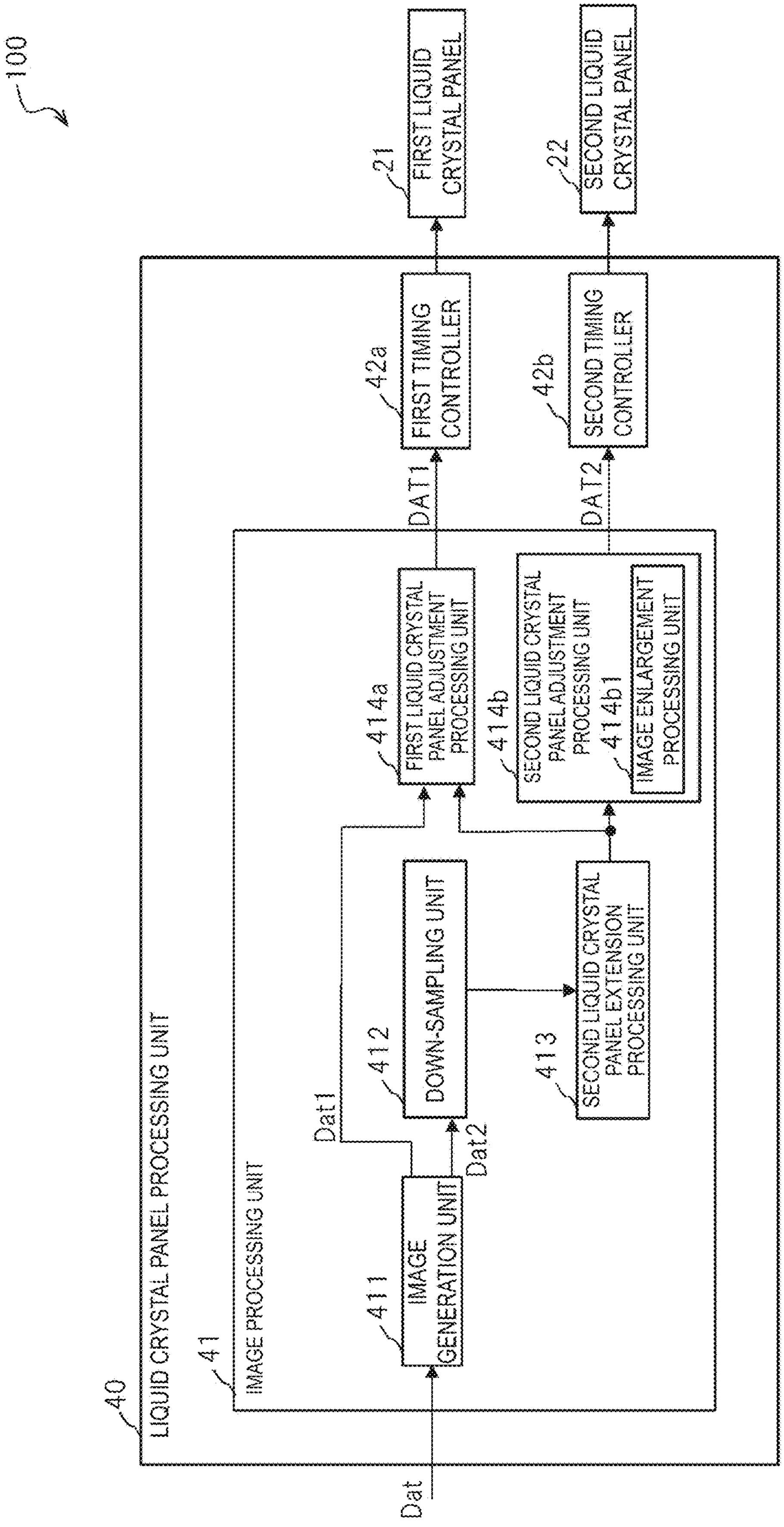
FIG. 2 is a block diagram schematically illustrating the liquid crystal display device according to the first embodiment.

FIG. 2 is a block diagram schematically illustrating the liquid crystal display device 100 according to the first embodiment. The liquid crystal display device 100 includes the liquid crystal panel processing unit 40 in addition to the first liquid crystal panel 21 and the second liquid crystal panel 22.

The liquid crystal panel processing unit 40 performs various types of signal processing for displaying an image on each of the first liquid crystal panel 21 and the second liquid crystal panel 22 based on an image signal Dat input from the outside. For example, the liquid crystal panel processing unit 40 includes an image processing unit 41, a first timing controller 42*a*, and a second timing controller 42*b*. The image processing unit 41 converts various image signals input from the outside into RGB digital signals and black-and-white digital signals. Then, the image processing unit 41 performs image processing on the converted RGB digital signals and outputs, to the first timing controller 42*a*, first image data DAT1 to be output to the first liquid crystal panel 21, and performs image processing on the converted black-and-white digital signals and outputs, to the second timing controller 42*b*, second image data DAT2 to be output to the second liquid crystal panel 22.

The first timing controller 42*a* outputs the first image data DAT1 acquired from the image processing unit 41 to the first liquid crystal panel 21 at an appropriate timing. As a result, the first liquid crystal panel 21 displays, in the display region DA1, the first image corresponding to the first image data DAT1.

The second timing controller 42*b* outputs the second image data DAT2 acquired from the image processing unit 41 to the second liquid crystal panel 22 at an appropriate timing. As a result, the second liquid crystal panel 22 displays, in the display region DA2, the second image corresponding to the second image data DAT2. In this manner, the second liquid crystal panel 22 displays, in the display region DA2, the second image synchronized with the first image displayed on the first liquid crystal panel 21.

The image processing unit 41 includes an image generation unit 411, a down-sampling unit 412, a second liquid crystal panel extension processing unit 413, a first liquid crystal panel adjustment processing unit 414*a*, and a second liquid crystal panel adjustment processing unit 414*b*. The second liquid crystal panel adjustment processing unit 414*b* includes an image enlargement processing unit 414*b*1.

For example, the image processing unit 41 includes a computer as a hardware configuration. The computer includes a processor that executes an image processing program to function as the image generation unit 411, the down-sampling unit 412, the second liquid crystal panel extension processing unit 413, the first liquid crystal panel adjustment processing unit 414*a*, and the second liquid crystal panel adjustment processing unit 414*b*. As long as the processor can realize the functions by executing the image processing program, any type of processor may be used. As the processor, it is possible to use various types of processors such as a central processing unit (CPU), a graphics processing unit (GPU), a digital signal processor (DSP), an application specific integrated circuit (ASIC), or a field programmable gate array (FPGA). The processor may include a peripheral circuit device in addition to CPU, GPU, DSP, or the like. The peripheral circuit device may be an integrated circuit (IC), or may include a resistor, a capacitor, and the like. The image processing unit 41 may include a computer-readable storage medium. The storage medium stores an image processing program in a non-transitory manner. The storage medium may be a semiconductor memory such as a static random access memory (SRAM), a dynamic random access memory (DRAM), a read only memory (ROM), or a flash memory, a register, a magnetic storage device such as a hard disk device (HDD), or an optical storage device such as an optical disk device. The image processing program may be stored in advance in the storage medium, or may be supplied to the storage medium via a wide-area communication network including the Internet or the like.

When the image generation unit 411 acquires the image signal Dat input from the outside, the image generation unit 411 generates, from the image signal Dat, a first image signal Dat1 to be output to the first liquid crystal panel 21 and a second image signal Dat2 to be output to the second liquid crystal panel 22. For example, the first image signal Dat1 is a color image signal including a grayscale value for each of red, green, and blue. On the other hand, for example, the second image signal Dat2 is a black-and-white image signal including a grayscale value indicating a contrasting density (gray scale) from black to white. The image generation unit 411 outputs the first image signal Dat1 to the first liquid crystal panel adjustment processing unit 414*a*, and outputs the second image signal Dat2 to the down-sampling unit 412.

The down-sampling unit 412 executes down-sampling for reducing the resolution on the second image signal Dat2 acquired from the image generation unit 411, thereby tailoring the second image signal Dat2 to the resolution of the second liquid crystal panel 22. For example, in a case where one pixel PX2 on the second liquid crystal panel 22 corresponds to four pixels PX1 on the first liquid crystal panel 21, based on a luminance value of a pixel having the highest luminance value among the four pixels PX1 on the first liquid crystal panel 21, the down-sampling unit 412 may obtain information indicating a luminance value of the corresponding one pixel PX2 on the second liquid crystal panel 22. Then, the down-sampling unit 412 outputs the second image signal Dat2 having the down-sampled resolution to the second liquid crystal panel extension processing unit 413.

When the second liquid crystal panel extension processing unit 413 acquires the second image signal Dat2 down-sampled by the down-sampling unit 412, the second liquid crystal panel extension processing unit 413 filters the acquired second image signal Dat2 to generate the second image signal Dat2. For example, the second liquid crystal panel extension processing unit 413 filters a luminance value of a pixel of interest in the second image signal Dat2 down-sampled by the down-sampling unit 412, based on a luminance value of adjacent pixels surrounding the pixel of interest.

FIG. 3 is a diagram showing an example of a filter coefficient used by the second liquid crystal panel extension processing unit 413 according to the first embodiment. Specifically, the second liquid crystal panel extension processing unit 413 uses the filter coefficient as illustrated in FIG. 3 to perform filtering by the following Equation (1). Note that, in FIG. 3, a coefficient of a 7×7 filter is given as an example. In addition, "mask0" indicates the coefficient of the filter in Equation (1).

[Equation 1]

$$\mathrm{output}(x, y) = \sum_{mx=0}^{msize-1} \sum_{my=0}^{msize-1} \mathrm{mask0}(mx, my) \times \mathrm{input}(x + mx - msize/2,\ y + my - msize/2) \tag{1}$$

The second liquid crystal panel extension processing unit 413 outputs the filtered second image signal Dat2 generated by filtering to each of the first liquid crystal panel adjustment processing unit 414*a* and the second liquid crystal panel adjustment processing unit 414*b*.

The first liquid crystal panel adjustment processing unit 414*a* generates the first image data DAT1, which is image data for displaying the first image on the first liquid crystal panel 21, based on the filtered second image signal Dat2 acquired from the second liquid crystal panel extension processing unit 413 and the first image signal Dat1 acquired from the image generation unit 411. In order for a desired image to be displayed by the liquid crystal display device 100 when an image is displayed on each of the first liquid crystal panel 21 and the second liquid crystal panel 22, the first liquid crystal panel adjustment processing unit 414*a* adjusts a grayscale value of the first image data DAT1, with reference to the filtered second image signal Dat2 input from the second liquid crystal panel extension processing unit 413, and generates the first image data DAT1 having the adjusted grayscale value. Then, the first liquid crystal panel adjustment processing unit 414*a* outputs the first image data DAT1 having the adjusted grayscale value to the first timing controller 42*a*.

The first timing controller 42*a* outputs the first image data DAT1 acquired from the first liquid crystal panel adjustment processing unit 414*a* to the first liquid crystal panel 21 at a predetermined timing. As a result, on the first liquid crystal panel 21, a gate driver (not illustrated) and a source driver (not illustrated) are driven to display the first image in the display region DA1 based on the first image data DAT1 acquired from the first timing controller 42*a*.

Figure 10:
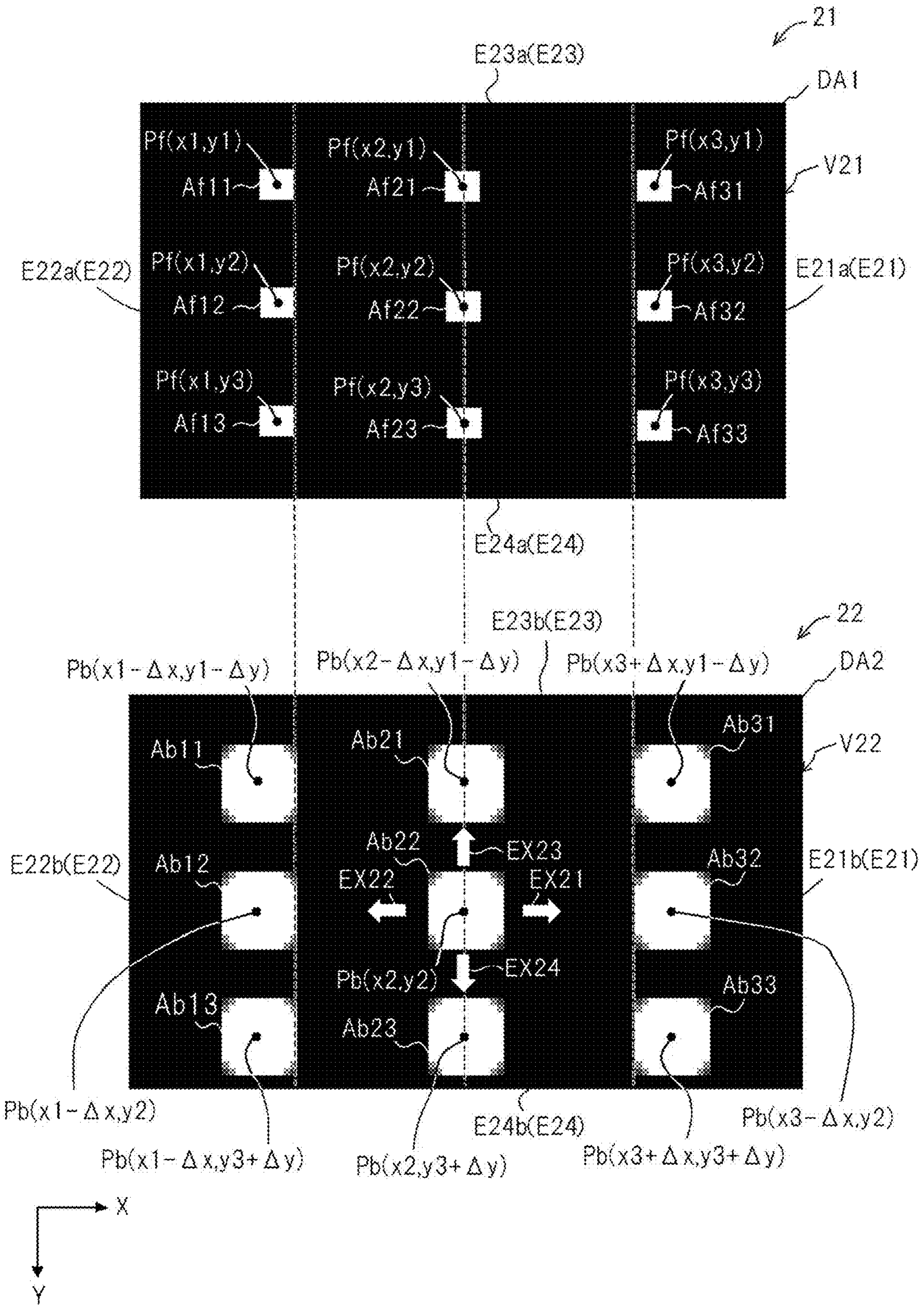
FIG. 10 is a diagram illustrating a state of appearance of a first image and a second image when a user illustrated in FIG. 6 sees a display region of the liquid crystal display device, according to the first embodiment.

When the second liquid crystal panel adjustment processing unit 414*b* acquires the filtered second image signal Dat2 from the second liquid crystal panel extension processing unit 413, the image enlargement processing unit 414*b*1 generates the second image obtained by enlarging a pre-enlargement image V22*a* (to be described below with reference to FIGS. 11 to 13) based on the filtered second image signal Dat2 from a predetermined enlargement center position in the second liquid crystal panel 22 (e.g., a position Pf(x2, y2) indicated in FIG. 10) toward an end portion of the second liquid crystal panel 22, that is, generates the second image data DAT2, which is data for displaying the second image. Note that a specific example of processing performed by the image enlargement processing unit **414*b*1 will be described below with reference to FIG. 10 and the subsequent drawings. Then, the second liquid crystal panel adjustment processing unit 414*b* outputs the second image data DAT2 in which the image enlargement processing unit 414*b*1 has enlarged the image, to the second timing controller 42*b***.

The second timing controller **42*b* outputs the second image data DAT2 acquired from the second liquid crystal panel adjustment processing unit 414*b* to the second liquid crystal panel 22 at a predetermined timing. As a result, on the second liquid crystal panel 22, a gate driver (not illustrated) and a source driver (not illustrated) are driven to display the second image based on the second image data DAT2 acquired from the second timing controller 42*b* in the display region DA2 in such a manner so as to synchronize the second image with the first image. This displays an image in which the first image and the second image overlap each other in the display region DA1 of the first liquid crystal panel 21**.

Next, before describing a specific example of processing performed by the image enlargement processing unit **414*b*1, a comparative example will be described with reference to FIGS. 4 to 9. A liquid crystal display device 200 according to the comparative example to be described with reference to FIGS. 4 to 9 is an example different from the liquid crystal display device 100 for describing the liquid crystal display device 100** according to the first embodiment.

Figure 4:
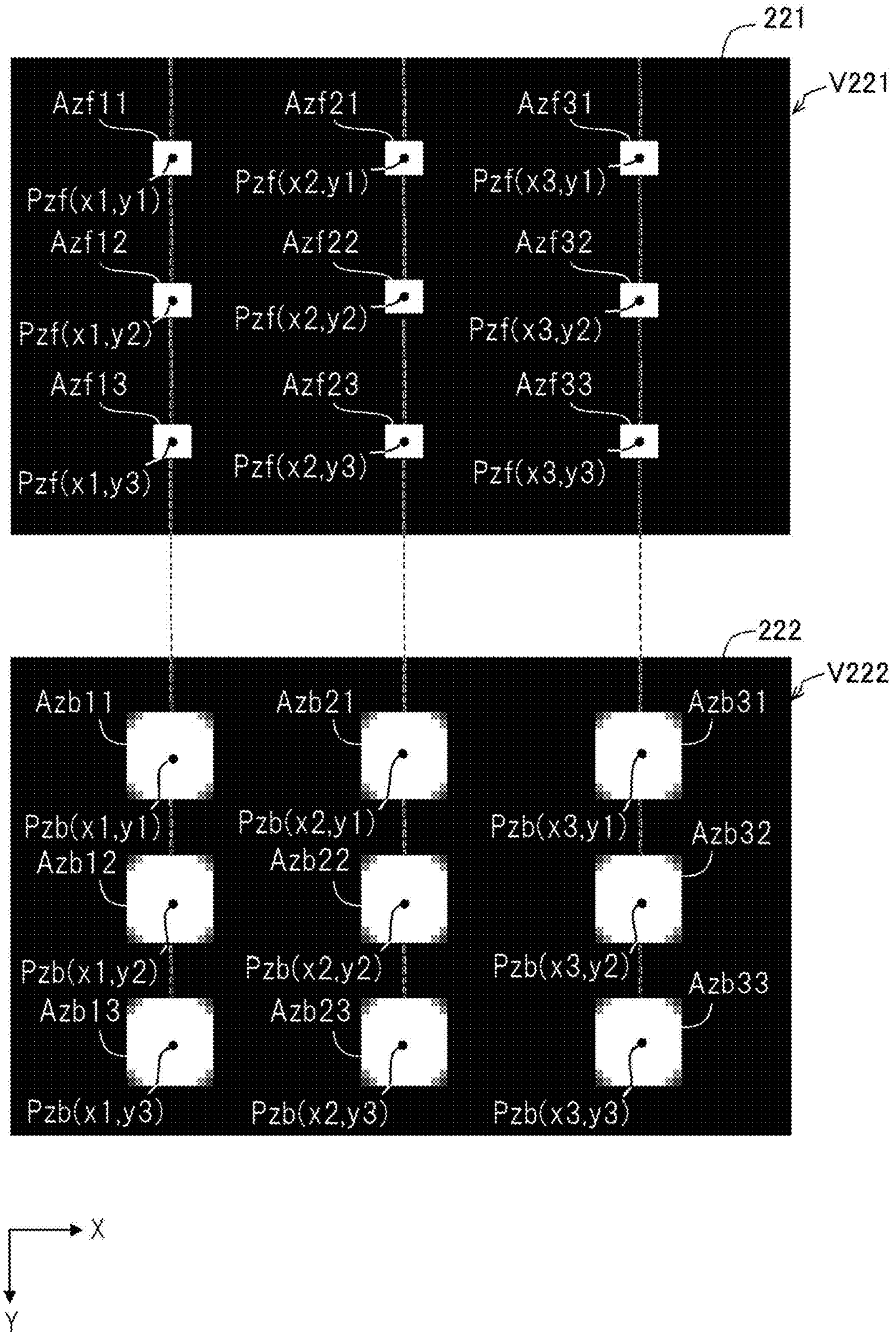
FIG. 4 is a diagram illustrating a first image displayed on a first liquid crystal panel and a second image displayed on a second liquid crystal panel, the first liquid crystal panel and the second liquid crystal panel being included in a liquid crystal display device according to a comparative example.

FIG. 4 is a diagram illustrating a first image V221 displayed on a first liquid crystal panel 221 and a second image V222 displayed on a second liquid crystal panel 222, the first liquid crystal panel 221 and the second liquid crystal panel 222 being included in the liquid crystal display device 200 according to the comparative example. The liquid crystal display device 200 includes the first liquid crystal panel 221 provided on a relatively front surface side, the second liquid crystal panel 222 provided to overlap a rear surface of the first liquid crystal panel 221, and a backlight (not illustrated) provided on a rear surface side of the second liquid crystal panel 222 (a side opposite to the first liquid crystal panel 221 with respect to the second liquid crystal panel 222).

The first liquid crystal panel 221 displays the first image V221 in a display region. The second liquid crystal panel 222 displays the second image V222 synchronized with the first image V221. For example, the first image V221 has nine display elements Azf11 to Azf13, Azf21 to Azf23, and Azf31 to Azf33 arranged in a matrix.

The display element Azf11 has a center coordinate with a position Pzf(x1, y1), the display element Azf12 has a center coordinate with a position Pzf(x1, y2) in the first image V221, and the display element Azf13 has a center coordinate with a position Pzf(x1, y3), and each of the display elements is an image that a predetermined number of pixels in each of the X direction, the −X direction, the Y direction, and the −Y direction display. The display element Azf21 has a center coordinate with a position Pzf(x2, y1), a display element Azf22 has a center coordinate with a position Pzf(x2, y2), and the display element Azf23 has a center coordinate with a position Pzf(x2, y3), and each of the display elements is an image that a predetermined number of pixels in each of the X direction, the −X direction, the Y direction, and the −Y direction display. The display element Azf31 has a center coordinate with a position Pzf(x3, y1), the display element Azf32 has a center coordinate with a position Pzf(x3, y2), and the display element Azf33 has a center coordinate with a position Pzf(x3, y3), and each of the display elements is an image that a predetermined number of pixels in each of the X direction, the −X direction, the Y direction, and the −Y direction display. Note that the position Pzf(x1, y1) to the position Pzf(x1, y3), the position Pzf(x2, y1) to the position Pzf(x2, y3), and the position Pzf(x3, y1) to the position Pzf(x3, y3) each indicate a coordinate position in the first image V221, and indicate positions that are aligned in order from x1 to x3 in the X direction and aligned in order from y1 to y3 in the Y direction.

The second image V222 synchronized with the first image V221 and displayed in the display region on the second liquid crystal panel 222 is an image obtained by filtering a pre-enlargement image, which is an image before enlargement, to enlarge the pre-enlargement image. The pre-enlargement image includes a plurality of display elements whose number, coordinate positions, and sizes are the same as those of the display elements Azf11 to Azf13, Azf21 to Azf23, and Azf31 to Azf33 included in the first image V221.

A gap is structurally generated between the first liquid crystal panel 221 and the second liquid crystal panel 222, and thus, in order for an image (an image to be visually recognized by a user) obtained by superimposing the first image V221 and the second image V222 to be prevented from becoming an image in which the first image V221 is partially deficient, the second image V222 displayed on the second liquid crystal panel 222 on the back panel side is made larger than the first image V221 displayed on the first liquid crystal panel 221 on the front panel side.

The second image V222 includes nine display elements Azb11 to Azb13, Azb21 to Azb23, and Azb31 to Azb33 arranged in a matrix.

The display element Azb11 is an image obtained by enlarging a pre-enlargement display element having a center coordinate with a position Pzb(x1, y1) and a size the same as that of the display element Azf11, the position Pzb(x1, y1) being the same coordinate position as the position Pzf(x1, y1) that is the center coordinate of the display element Azf11, at a constant enlargement ratio in each of the X direction, the −X direction, the Y direction, and the −Y direction. The display element Azb12 is an image obtained by enlarging a pre-enlargement display element having a center coordinate with a position Pzb(x1, y2) and a size the same as that of the display element Azf12, the position Pxb(x1, y2) being the same coordinate position as the position Pzf(x1, y2) that is the center coordinate of the display element Azf12, at a constant enlargement ratio in each of the X direction, the −X direction, the Y direction, and the −Y direction. The display element Azb13 is an image obtained by enlarging a pre-enlargement display element having a center coordinate with a position Pzb(x1, y3) and a size the same as that of the display element Azf13, the position Pzb(x1, y3) being the same coordinate position as the position Pzf(x1, y3) that is the center coordinate of the display element Azf13, at a constant enlargement ratio in each of the X direction, the −X direction, the Y direction, and the −Y direction.

The display element Azb21 is an image obtained by enlarging a pre-enlargement display element having a center coordinate with a position Pzb(x2, y1) and a size the same as that of the display element Azf21, the position Pzb(x2, y1) being the same coordinate position as the position Pzf(x2, y1) that is the center coordinate of the display element Azf21, at a constant enlargement ratio in each of the X direction, the −X direction, the Y direction, and the −Y direction. The display element Azb22 is an image obtained by enlarging a pre-enlargement display element having a center coordinate with a position Pzb(x2, y2) and a size the same as that of the display element Azf22, the position Pzb(2, y2) being the same coordinate position as the position Pzf(x2, y2) that is the center coordinate of the display element Azf22, at a constant enlargement ratio in each of the X direction, the −X direction, the Y direction, and the −Y direction. The display element Azb23 is an image obtained by enlarging a pre-enlargement display element having a center coordinate with a position Pzb(x2, y3) and a size the same as that of the display element Azf23, the position Pzb(x2, y3) being the same coordinate position as the position Pzf(x2, y3) that is the center coordinate of the display element Azf23, at a constant enlargement ratio in each of the X direction, the −X direction, the Y direction, and the −Y direction.

The display element Azb31 is an image obtained by enlarging a pre-enlargement display element having a center coordinate with a position Pzb(x3, y1) and a size the same as that of the display element Azf31, the position Pzb(x3, y1) being the same coordinate position as the position Pzf(x3, y1) that is the center coordinate of the display element Azf31, at a constant enlargement ratio in each of the X direction, the −X direction, the Y direction, and the −Y direction. The display element Azb32 is an image obtained by enlarging a pre-enlargement display element having a center coordinate with a position Pzb(x3, y2) and a size the same as that of the display element Azf32, the position Pzb(x3, y2) being the same coordinate position as the position Pzf(x3, y2) that is the center coordinate of the display element Azf32, at a constant enlargement ratio in each of the X direction, the −X direction, the Y direction, and the −Y direction. The display element Azb33 is an image obtained by enlarging a pre-enlargement display element having a center coordinate with a position Pzb(x3, y3) and a size the same as that of the display element Azf33, the position Pzb(x3, y3) being the same coordinate position as the position Pzf(x3, y3) that is the center coordinate of the display element Azf33, at a constant enlargement ratio in each of the X direction, the −X direction, the Y direction, and the −Y direction.

Figure 5:
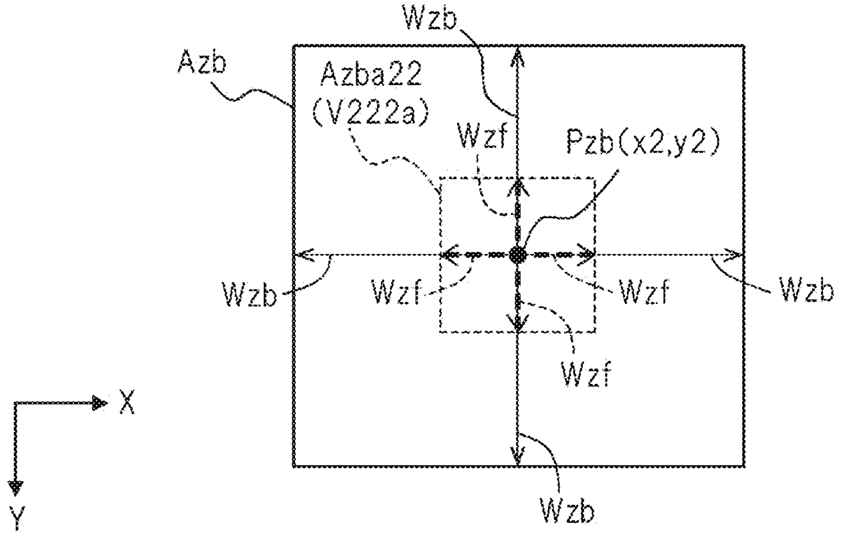
FIG. 5 is a diagram illustrating a state in which the liquid crystal display device according to the comparative example enlarges a pre-enlargement image to obtain the second image.

FIG. 5 is a diagram illustrating a state in which the liquid crystal display device 200 according to the comparative example enlarges the pre-enlargement image V222*a* to obtain the second image V222. As illustrated in FIG. 5, the pre-enlargement image V222*a* includes a pre-enlargement display element Azba22 that is to be the display element Azb22 of the second image V222. The pre-enlargement display element Azba22 is assumed to be a rectangular image (an image of a part of the pre-enlargement image V222*a*) having a center coordinate with a position Pzb(x2, y2) and a width Wzf in each of the X direction, the −X direction, the Y direction, and the −Y direction from the position Pzb(x2, y2).

Then, the liquid crystal display device 200 applies a constant enlargement ratio to the width Wzf in each of the X direction, the −X direction, the Y direction, and the −Y direction of the pre-enlargement display element Azba22 to obtain the rectangular display element Azb22 having a center coordinate with a position Pzb(x2, y2) and a width Wb in each of the X direction, the −X direction, the Y direction, and the −Y direction. The liquid crystal display device 200 enlarges each of the display elements Azb11 to Azb13, Azb21 to Azb23, and Azb31 to Azb33 before enlargement by a constant enlargement ratio in each of the X direction, the −X direction, the Y direction, and the −Y direction from the center coordinate to obtain each of the display elements Azb11 to Azb13, Azb21 to Azb23, and Azb31 to Azb33 after enlargement, respectively.

Figure 6:
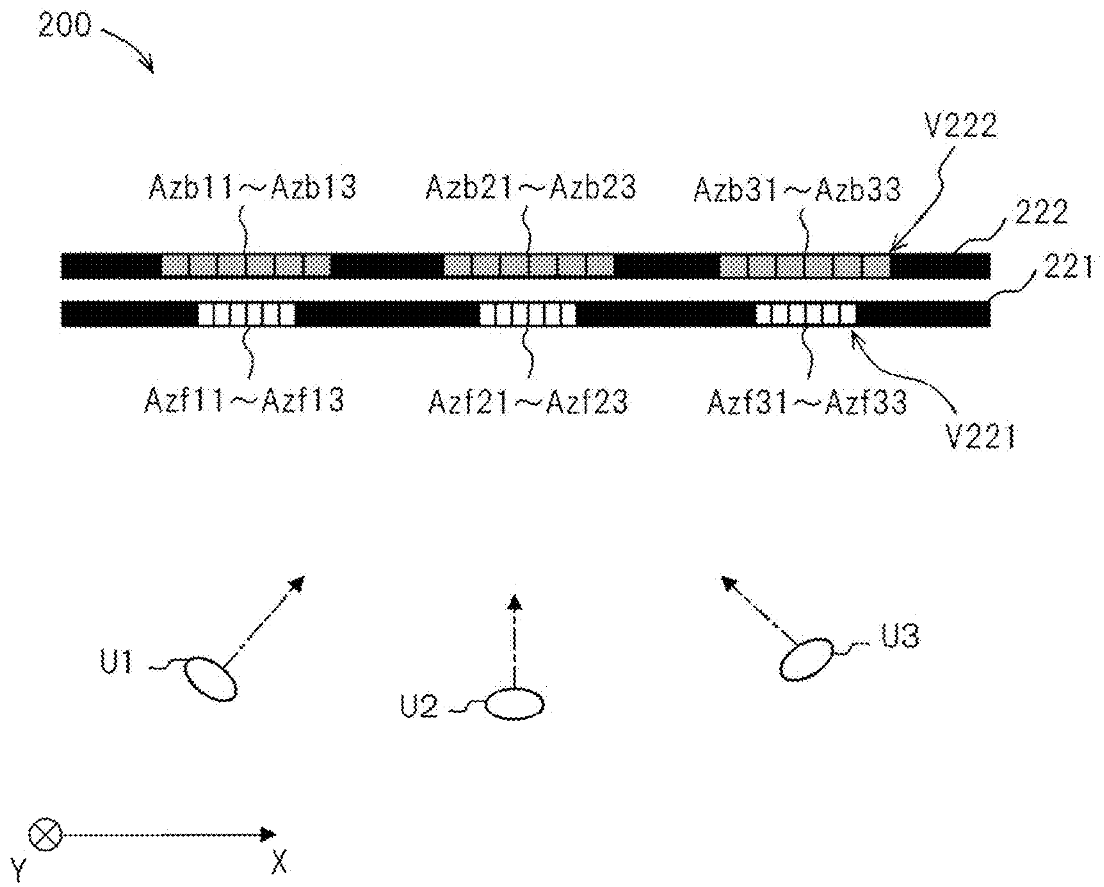
FIG. 6 is a schematic view of the liquid crystal display device being viewed by a user, according to a comparative example, as viewed from above.

FIG. 6 is a schematic view of the liquid crystal display device 200 being viewed by a user, according to the comparative example, as viewed from above. Note that in FIG. 6, the backlight of the liquid crystal display panel 200 is omitted.

As illustrated in FIG. 6, the first image V221 displayed on the first liquid crystal panel 221 provided on the front surface side and the second image V222 displayed on the second liquid crystal panel 222 provided on the rear surface side overlap each other, and the overlapping image is visually recognized by the user. A user U2 is assumed to be viewing the image displayed in the display region from the normal direction passing through the center point of the display region of the liquid crystal display device 200. A user U1 is assumed to be located in the left direction (−X direction) of the display region of the liquid crystal display device 200 with respect to the center point and viewing the image displayed in the display region in a diagonal direction from the left front toward the center of the display region. A user U3 is assumed to be located in the right direction (X direction) of the display region of the liquid crystal display device 200 with respect to the center point and viewing the image displayed in the display region in a diagonal direction from the right front toward the center of the display region.

Figure 7:
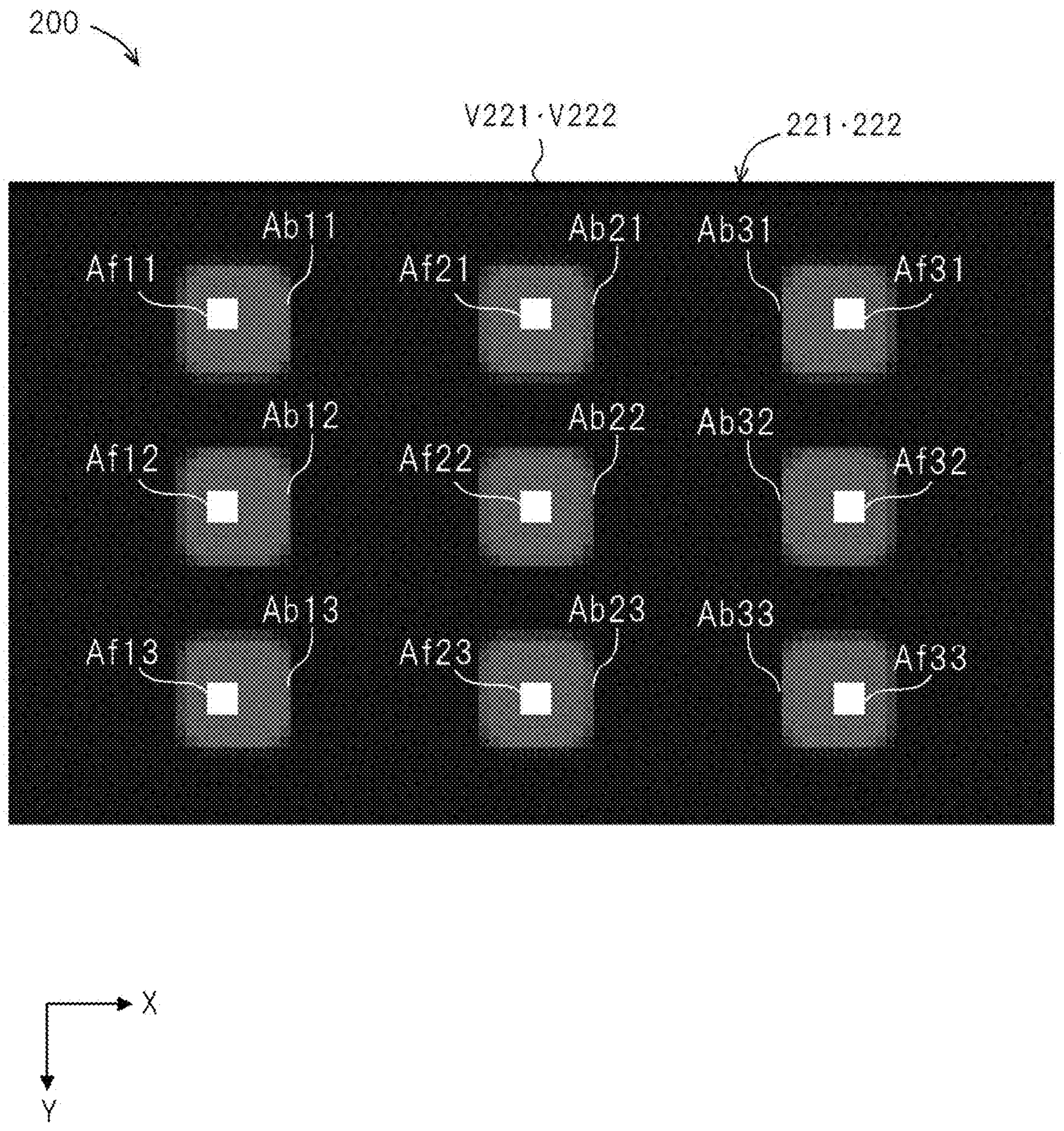
FIG. 7 is a diagram illustrating a state of appearance of the first image and the second image when a display region of the liquid crystal display device is seen in a normal direction passing through a center point of the display region, according to the comparative example.
Figure 8:
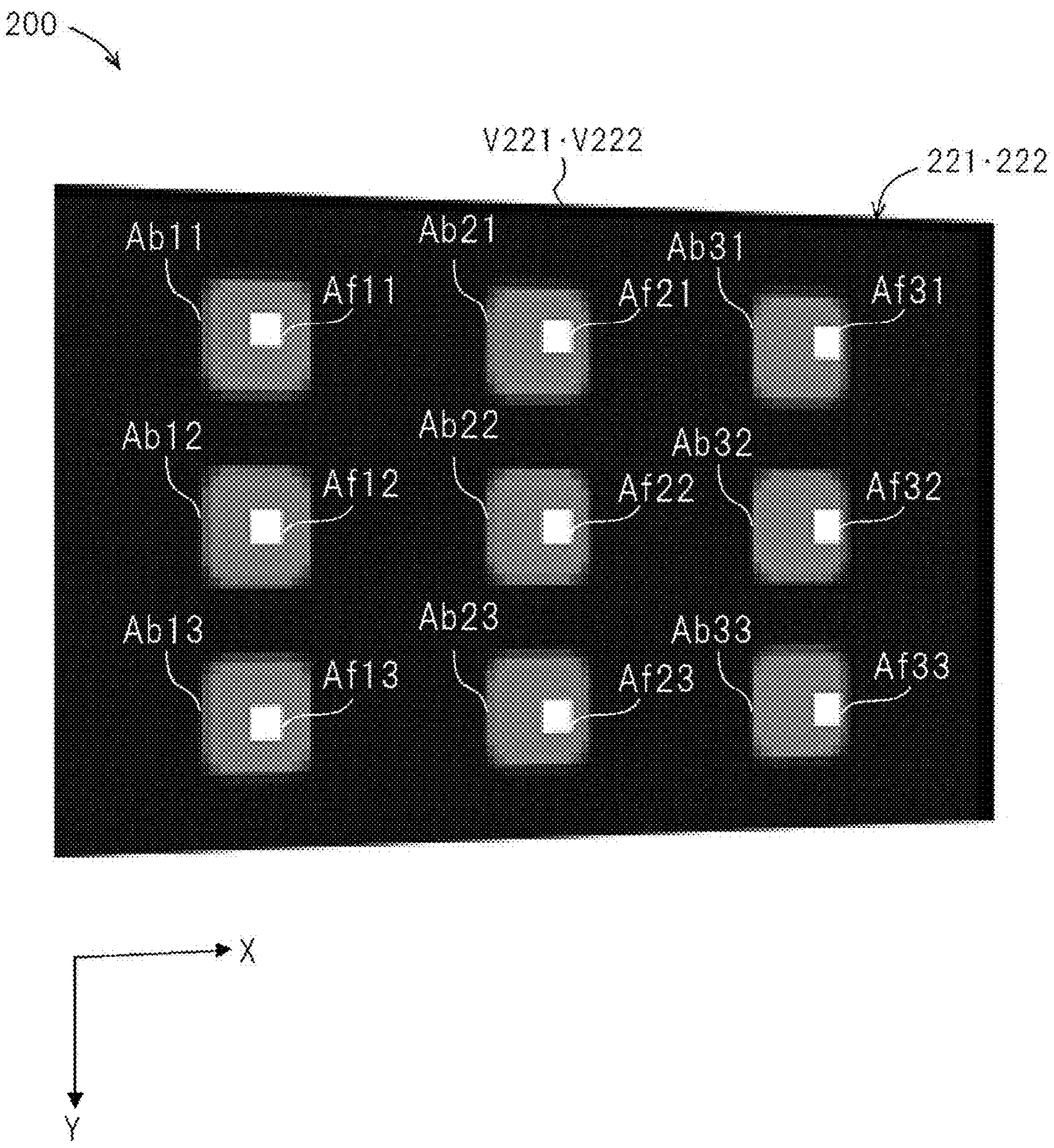
FIG. 8 is a diagram illustrating a state of appearance of the first image and the second image when the display region of the liquid crystal display device is seen from the left front in a diagonal direction, according to the comparative example.
Figure 9:
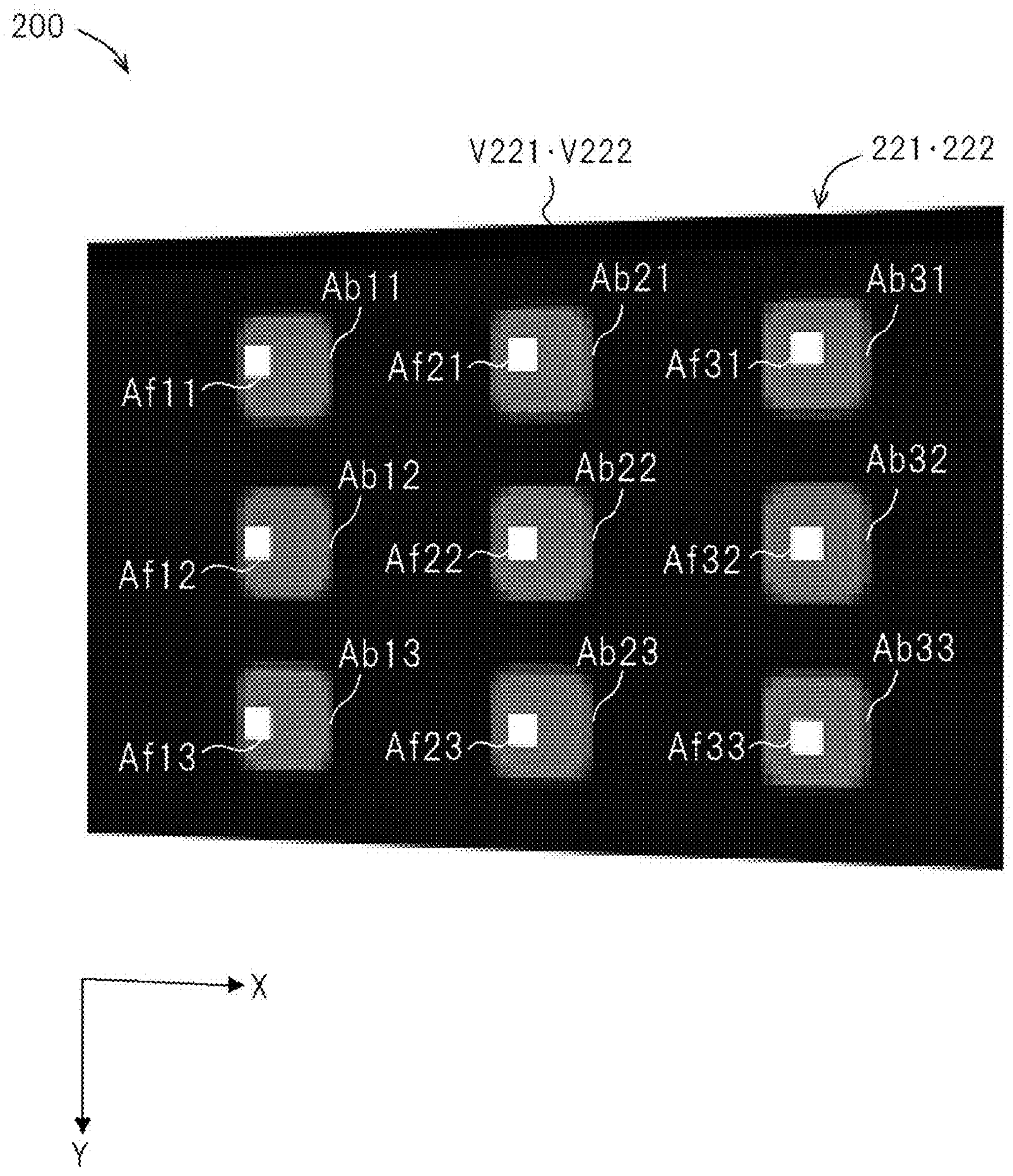
FIG. 9 is a diagram illustrating a state of appearance of the first image and the second image when the display region of the liquid crystal display device is seen from the right front in a diagonal direction, according to the comparative example.

FIG. 7 is a diagram illustrating a state of appearance of the first image V211 and the second image V222 when the display region of the liquid crystal display device 200 is seen in the normal direction passing through the center point of the display region, according to the comparative example. FIG. 8 is a diagram illustrating a state of appearance of the first image V211 and the second image V222 when the display region of the liquid crystal display device 200 is seen in a diagonal direction from the left front, according to the comparative example. FIG. 9 is a diagram illustrating a state of appearance of the first image V211 and the second image V222 when the display region of the liquid crystal display device 200 is seen in a diagonal direction from the right front, according to the comparative example. In other words, FIG. 7 illustrates a state of appearance of the first image V211 and the second image V222 when the user U2 illustrated in FIG. 6 sees the display region of the liquid crystal display device 200. FIG. 8 illustrates a state of appearance of the first image V211 and the second image V222 when the user U1 illustrated in FIG. 6 sees the display region of the liquid crystal display device 200. FIG. 9 illustrates a state of appearance of the first image V211 and the second image V222 when the user U3 illustrated in FIG. 6 sees the display region of the liquid crystal display device 200.

When the user U2 sees the liquid crystal display device 200 from the front as illustrated in FIGS. 6 and 7, when the user U1 sees the liquid crystal display device 200 from the left front in a diagonal direction as illustrated in FIGS. 6 and 8, or when the user U3 sees the liquid crystal display device 200 from the right front in a diagonal direction as illustrated in FIGS. 6 and 9, the display elements Azb11 to Azb13, Azb21 to Azb23, and Azb31 to Azb33 in the second image V222 are displayed in such a manner as to sufficiently widely surround the peripheries of the display elements Azf11 to Azf13, Azf21 to Azf23, and Azf31 to Azf33 in the first image V221, respectively, and in any case, the display elements Azf11 to Azf13, Azf21 to Azf23, Azf31 to Azf33 in the first image V221 do not protrude from the display elements Azb11 to Azb13, Azb21 to Azb23, and Azb31 to Azb33 in the second image V222.

Thus, when seen by the user U2 from the front (see FIGS. 6 and 7), when seen by the user U1 from the left front (see FIGS. 6 and 8), or when seen by the user U3 from the right front (see FIGS. 6 and 9), the liquid crystal display device 200 can prevent an image in which the display elements Azf11 to Azf13, Azf21 to Azf23, and Azf31 to Azf33 in the first image V221 are partially deficient from being seen.

However, according to the liquid crystal display device 200, the second image V222 is created by generating the display elements Azb11 to Azb13, Azb21 to Azb23, and Azb31 to Azb33 by enlargement with a constant enlargement ratio (i.e., using a constant filter coefficient).

Thus, as compared to an area of each of the display elements Azf11 to Azf13, Azf21 to Azf23, and Azf31 to Azf33 in first image V221, an area of each of the enlarged display elements Azb11 to Azb13, Azb21 to Azb23, and Azb31 to Azb33 in the second image V222 may be too large. As a result, around each of the display elements Azf11 to Azf13, Azf21 to Azf23, and Azf31 to Azf33 in the first image, a portion of each of the display elements Azb11 to Azb13, Azb21 to Azb23, and Azb31 to Azb33, the portion protruding from each of the display elements in the first image because the area is too large, is visible, so that the contrast around each of the display elements Azf11 to Azf13, Azf21 to Azf23, and Azf31 to Azf33 may be worsened.

Next, with reference to FIGS. 10 to 17, a specific example of processing performed by the image enlargement processing unit 414*b*1 according to the first embodiment will be described. FIG. 10 is a diagram illustrating the first image V21 displayed on the first liquid crystal panel 21 and the second image V22 displayed on the second liquid crystal panel 22 according to the first embodiment. Note that the first image V21 and the second image V22 illustrated in FIG. 10 are examples, and the images displayed on the first liquid crystal panel 21 and the second liquid crystal panel 22 are not limited to the first image V21 and the second image V22 illustrated in FIG. 10. In addition, in the display region DA1, the region in which the first image V21 is displayed is the image display region, and in the display region DA2, the region in which the second image V22 is displayed is the image display region.

For example, the first image V21 displayed in the display region DA1 of the first liquid crystal panel 21 includes a plurality of (nine as an example) display elements Af11 to Af13, Af21 to Af23, and Af31 to Af33 arranged in a matrix. The display element Af11 has a center coordinate with a position Pf(x1, y1), the display element Af12 has a center coordinate with a position Pf(x1, y2) in the first image V21, the display element Af13 has a center coordinate with a position Pf(x1, y3), and each of the display elements is an image (an image of a part of the first image V21) that a predetermined number of pixels PX1 in each of the X direction, the −X direction, the Y direction, and the −Y direction display. The display element Af21 has a center coordinate with a position Pf(x2, y1), the display element f22 has a center coordinate with a position Pf(x2, y2), the display element Af23 has center coordinate with a position Pf(x2, y3), and each of the display elements is an image (an image of a part of the first image V21) that a predetermined number of pixels in each of the X direction, the −X direction, the Y direction, and the −Y direction display. Note that the position Pf(x2, y2) is a center coordinate of the display element Af22 and is also a center coordinate in the first image V21. The display element Af31 has a center coordinate with a position Pf(x3, y1), the display element Af32 has a center coordinate with a position Pf(x3, y2), the display element Af33 has a center coordinate with a position Pf(x3, y3), and each of the display elements is an image (an image of a part of the first image V21) that a predetermined number of pixels in each of the X direction, the −X direction, the Y direction, and the −Y direction display.

Note that the position Pf(x1, y1) to the position Pf(x1, y3), the position Pf(x2, y1) to the position Pf(x2, y3), and the position Pf(x3, y1) to the position Pf(x3, y3) each indicate a coordinate position in the first image V21, and indicate positions that are aligned in order from x1 to x3 in the X direction and aligned in order from y1 to y3 in the Y direction. That is, the position Pf(x1, y1) to the position Pf(x3, y1) are aligned in this order in the X direction. The position Pf(x1, y2) to the position Pf(x3, y2) are aligned in this order in the X direction. The position Pf(x1, y3) to the position Pf(x3, y3) are aligned in this order in the X direction. The position Pf(x1, y1) to the position Pf(x1, y3) are aligned in this order in the Y direction. The position Pf(x2, y1) to the position Pf(x2, y3) are aligned in this order in the Y direction. The position Pf(x3, y1) to the position Pf(x3, y3) are aligned in this order in the Y direction.

The second image V22 displayed in the display region DA2 of the second liquid crystal panel 22 is generated by enlarging the pre-enlargement image. The second image V22 includes a plurality of (nine as an example) display elements Ab11 to Ab13, Ab21 to Ab23, and Ab31 to Ab33 arranged in a matrix.

When the pre-enlargement image that is an image before enlargement is enlarged to obtain the second image V22, the image enlargement processing unit 414*b*1 sets a predetermined enlargement center position in the display region DA2 in the second liquid crystal panel 22, and enlarges the pre-enlargement image toward the end portions of the display region DA2 (the end portion E21 on the right side, the end portion E22 on the left side, the end portion E23 on the upper side, and the end portion E24 on the lower side) around the predetermined enlargement center position to obtain the second image V22. For example, the image enlargement processing unit 414*b*1 enlarges the pre-enlargement image using the following Equation (2) to obtain the second image V22.

[Equation 2]

$$\text{output}(x, y) = \text{input}\left(\frac{x}{\alpha} - ((\alpha-1)\times sizex)/2,\ \frac{y}{\alpha} - ((\alpha-1)\times sizey)/2\right) \tag{2}$$

"x" and "y" in Equation (2) above are coordinates in the first image V21. "α" is an enlargement ratio. "sizex" and "sizey" are resolutions in the lateral direction (−X direction and the X direction) and in the longitudinal direction (−Y direction and Y direction), respectively.

"(α−1)×size*x*/2" and "(α−1)×size*y*/2" are for alignment to center an output image with respect to an input image.

As to the enlargement ratio α, for example, in a case where enlargement is performed by 6 pixels in each of the left and the right in the lateral direction (−X direction and the X direction), when the resolution in the lateral direction of the second liquid crystal panel 22, that is, the number of pixels is 3840 pixels, it is possible to obtain the enlargement ratio α as follows.

$$\alpha=(3840+2\times6)/3840=1.003$$

The pre-enlargement image that the image enlargement processing unit 414*b*1 enlarges to generate the second image V22 includes a plurality of display elements whose number, coordinate positions, and sizes are the same as those of the display elements Af11 to Af13, Af21 to Af23, and Af31 to Af33 included in the first image V21. Then, the second image V22 includes the display elements Ab11 to Ab13, Ab21 to Ab23, and Ab31 to Ab33 obtained by enlarging the plurality of display elements corresponding to the display elements Af11 to Af13, Af21 to Af23, and Af31 to Af33 included in first image V21.

The enlargement center position when the image enlargement processing unit 414*b*1 enlarges the pre-enlargement image is assumed to be, as an example, the center coordinate of the pre-enlargement image (in other words, the center coordinate of the second image V22 after enlargement), and further the position Pb(x2, y2), which is the center coordinate of the display element Ab22. Note that the enlargement center position when the image enlargement processing unit 414*b*1 enlarges the image is not limited to the center coordinate of the pre-enlargement image (i.e., the center coordinate of the second image V22), and can be any coordinate of the pre-enlargement image (i.e., the second image V22).

The image enlargement processing unit 414*b*1 sets the position Pb(x2, y2) as the enlargement center position, and generates the second image V22 obtained by enlarging the entire pre-enlargement image toward the end portions in the second liquid crystal panel 22 (the end portions E21*b* to E24*b*), that is, in the plus-minus X directions (horizontal direction) and in the plus-minus Y directions (vertical direction).

Specifically, the image enlargement processing unit 414*b*1 sets the position Pb(x2, y2) as the enlargement center position, enlarges the pre-enlargement image from the position Pb(x2, y2) to the end portion E21*b* on the right side of the display region DA2, as indicated by an arrow EX21 extending in the X direction, enlarges the pre-enlargement image from the position Pb(x2, y2) to the end portion E22*b* on the left side of the display region DA2, as indicated by an arrow EX22 extending in the −X direction, enlarges the pre-enlargement image from the position Pb(x2, y2) to the end portion E23*b* on the upper side of the display region DA2, as indicated by an arrow EX23 extending in the −Y direction, and enlarges the pre-enlargement image from the position Pb(x2, y2) to the end portion E24*b* on the lower side of the display region DA2, as indicated by an arrow EX24 extending in the Y direction.

Figure 11:
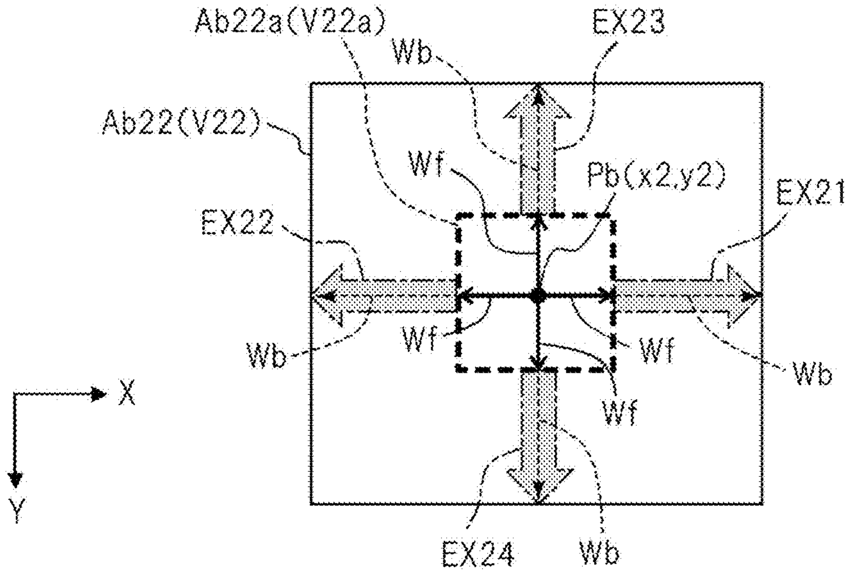
FIG. 11 is a diagram illustrating a state in which an image enlargement processing unit according to the first embodiment enlarges a pre-enlargement display element in a central portion of a pre-enlargement image to generate a display element in a central portion in the second image.

FIG. 11 is a diagram illustrating a state in which the image enlargement processing unit 414*b*1 according to the first embodiment enlarges a pre-enlargement display element Ab22*a* in the center of the pre-enlargement image V22*a* to generate the display element Ab22 in the center of the second image V22.

As illustrated in FIGS. 10 and 11, for example, the pre-enlargement display element Ab22*a* included in the center (a position corresponding to the display element Af22 in the first image V21) of the pre-enlargement image V22*a*, which is an image before enlargement as the second image V22, is assumed to be a rectangular image having a width Wf in each of the X direction, the −X direction, the Y direction, and the −Y direction from the position Pf(x2, y2), which is the center coordinate. Then, the image enlargement processing unit 414*b*1 sets the position Pb(x2, y2) that is the center coordinate of the pre-enlargement display element Ab22*a* as the enlargement center position, and multiplies the width Wf in each of the X direction, the −X direction, the Y direction, and the −Y direction by the enlargement ratio α to generate the rectangular display element Ab22 having the width Wb in each of the X direction, the −X direction, the Y direction, and the −Y direction with the position Pb(x2, y2) as the enlargement center position. In each of the pre-enlargement display element Ab22*a* and the display element Ab22, the center coordinate is coincident with the enlargement center position for enlarging the entire pre-enlargement image V22*a*, and thus, the center coordinates are the same as each other before and after enlargement.

On the other hand, in the second image V22 after enlargement, coordinate positions of regions closer to the end portions E21, E22, E23, and E24 than the position Pb(x2, y2), which is the enlargement center position, shift to get close to the end portions E21, E22, E23, and E24 as compared to coordinate positions of the corresponding regions included in the pre-enlargement image V22*a*.

Figure 12:
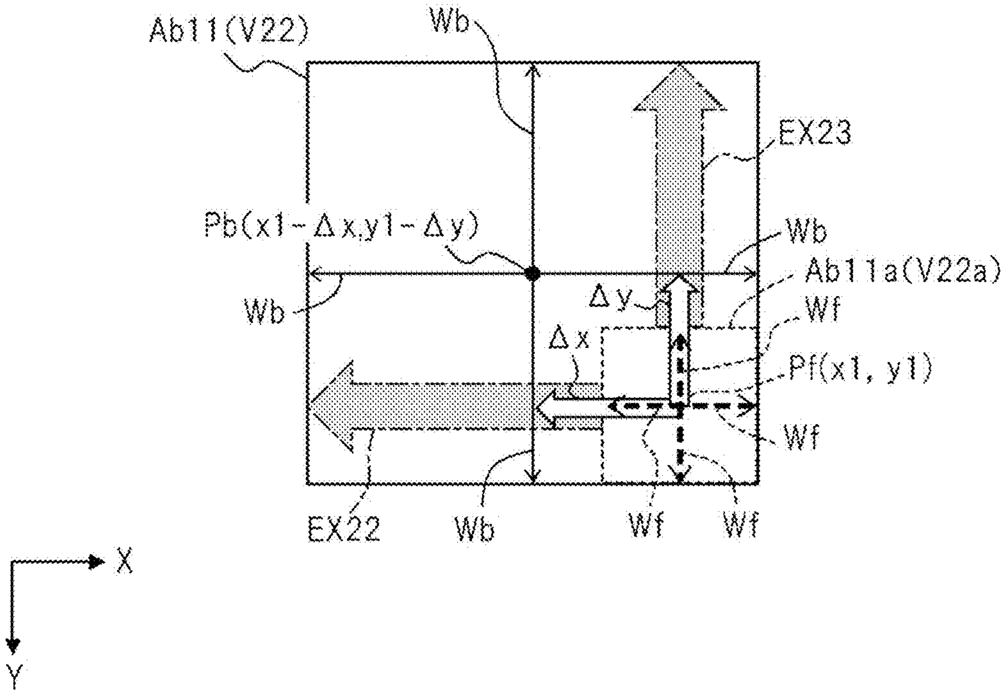
FIG. 12 is a diagram illustrating a state in which the image enlargement processing unit according to the first embodiment enlarges a pre-enlargement display element in a left upper end of the pre-enlargement image to generate a display element in a left upper end in the second image.

FIG. 12 is a diagram illustrating a state in which the image enlargement processing unit 414*b*1 according to the first embodiment enlarges a pre-enlargement display element Ab11*a* of the left upper end of the pre-enlargement image V22*a* to generate the display element Ab11 of the left upper end in the second image V22.

As illustrated in FIGS. 10 and 12, for example, the pre-enlargement display element Ab11*a* included in the left upper end of the pre-enlargement image V22*a* (a position corresponding to the display element Af11 in the first image V21), which is an image before enlargement as the second image V22, is assumed to be a rectangular image having a width Wf in each of the X direction, the −X direction, the Y direction, and the −Y direction from the position Pf(x1, y1), which is the center coordinate.

The pre-enlargement display element Ab11*a* is closer to the end portion E22 on the left side and the end portion E23 on the upper side than the position Pf(x2, y2), which is the enlargement center position, and thus, enlargement is performed in a direction in which the entire position of the pre-enlargement display element Ab11*a* gets close to the end portion E22 on the left side and the end portion E23 on the upper side. In other words, the image enlargement processing unit 414*b*1 enlarges the widths Wf in the plus-minus X direction (width Wf×2) by the enlargement ratio α in the −X direction as indicated by the arrow EX22 in FIG. 12 and the widths Wf in the plus-minus Y direction (width Wf×2) by the enlargement ratio α in the −Y direction as indicated by the arrow EX23 in FIG. 12, of the pre-enlargement display element Ab11*a*, to generate the display element Ab11 after enlargement. For example, the display element Ab11 after enlargement has a rectangular shape having the width Wb in each of the X direction, the −X direction, the Y direction, and the −Y direction from the center coordinates after enlargement. Then, the center coordinate of the display element Ab11 after enlargement shifts from the position Pf(x1, y1), which is the center coordinate before enlargement, by Δx in the −X direction and by Δy in the −Y direction to be a position Pf(x1−Δx, y1−Δy).

Figure 13:
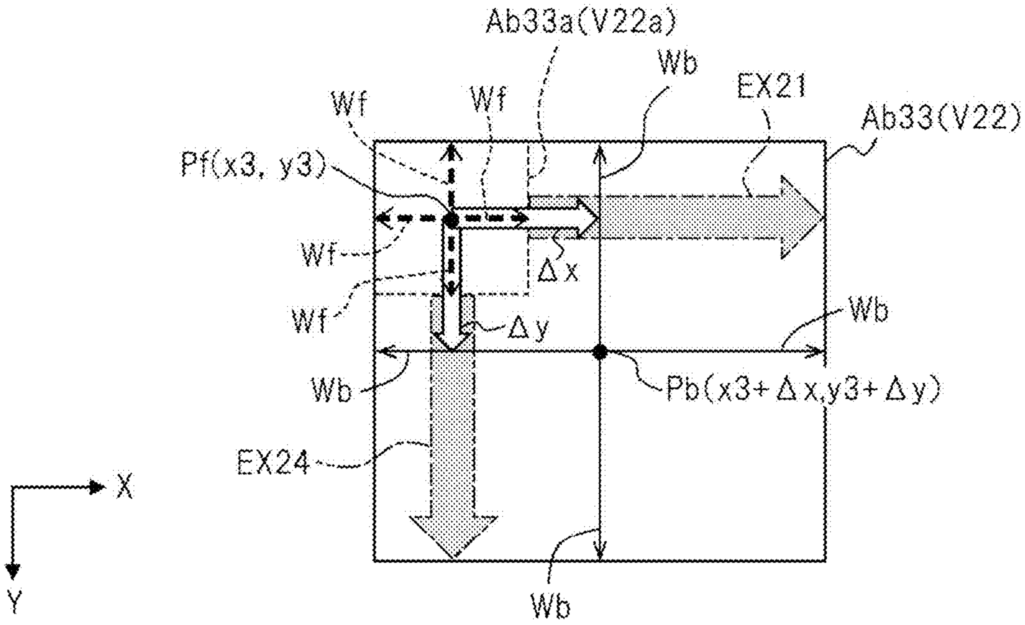
FIG. 13 is a diagram illustrating a state in which the image enlargement processing unit according to the first embodiment enlarges a pre-enlargement display element in a right lower end of the pre-enlargement image to generate a display element in a right lower end in the second image.

FIG. 13 is a diagram illustrating a state in which the image enlargement processing unit 414*b*1 according to the first embodiment enlarges a pre-enlargement display element Ab33*a* in the right lower end of the pre-enlargement image V22*a* to generate the display element Ab33 in the right lower end in the second image V22.

As illustrated in FIGS. 10 and 13, for example, the pre-enlargement display element Ab33*a* included in the right lower end (a position corresponding to the display element Af33 in the first image V21) in the pre-enlargement image V22*a*, which is an image before enlargement, as the second image V22 is assumed to be a rectangular image having the width Wf in each of the X direction, the −X direction, the Y direction, and the −Y direction from the position Pf(x3, y3), which is the center coordinate.

The pre-enlargement display element Ab33*a* is closer to the end portion E21 on the right side and the end portion E24 on the lower side than the position Pf(x2, y2), which is the enlargement center position, and thus, enlargement is performed in a direction in which the entire position of the pre-enlargement display element Ab33*a* gets close to the end portion E21 on the right side and the end portion E24 on the lower side. In other words, the image enlargement processing unit 414*b*1 enlarges the widths Wf in the plus-minus X direction (width Wf×2) by the enlargement ratio α in the X direction as indicated by the arrow EX21 in FIG. 13 and the widths Wf in the plus-minus Y direction (width Wf×2) by the enlargement ratio α in the Y direction as indicated by the arrow EX24 in FIG. 13, of the pre-enlargement display element Ab33*a*, to generate the display element Ab33 after enlargement. For example, the display element Ab33 after enlargement has a rectangular shape having the width Wb in each of the X direction, the −X direction, the Y direction, and the −Y direction from the center coordinates after enlargement. Then, the center coordinate of the display element Ab33 after enlargement shifts from the position Pf(x3, y3), which is the center coordinate before enlargement, by Δx in the X direction and by Δy in the Y direction to be a position Pf(x1+Δx, y1+Δy).

Similarly, as illustrated in FIG. 10, the image enlargement processing unit 414*b*1 enlarges the pre-enlargement display element at a position closer to the end portion E22 on the left side (a position corresponding to the display element Af12 in the first image V21) of the pre-enlargement image V22*a* than the position Pf(x2, y2), which is the enlargement center position, in such a manner as to get close to the end portion E22 on the left side to generate the display element Ab12 after enlargement. The center coordinate of the display element Ab12 shifts in a direction from the position Pb(x1, y2), which is the center coordinate of the pre-enlargement display element, toward the end portion E22 (the −X direction indicated by the arrow EX22) to be a position Pb(x1−Δx, y2). In addition, the image enlargement processing unit 414*b*1 enlarges the pre-enlargement display element at a position closer to the end portion E22 on the left side and an end portion 24 on the lower side (a position corresponding to the display element Af13 in the first image V21) of the pre-enlargement image V22*a* than the position Pf(x2, y2), which is the enlargement center position, in such a manner as to get close to the end portion E22 on the left side and the end portion E24 on the lower side to generate the display element Ab13 after enlargement. The center coordinate of the display element Ab13 shifts in a direction from the position Pb(x1, y3), which is the center coordinate of the pre-enlargement display element, toward the end portion E22 and the end portion E24 (the −X direction indicated by the arrow EX22 and the Y direction indicated by the arrow EX24) to be a position Pb(x1−Δx, y2+Δy).

In addition, the image enlargement processing unit 414*b*1 enlarges the pre-enlargement display element at a position closer to the end portion E23 on the upper side (a position corresponding to the display element Af21 in the first image V21) of the pre-enlargement image V22*a* than the position Pf(x2, y2), which is the enlargement center position, in such a manner as to get close to the end portion E23 on the upper side to generate the display element Ab21 after enlargement. The center coordinate of the display element Ab21 shifts in a direction from the position Pb(x2, y1), which is the center coordinate of the pre-enlargement display element, toward the end portion E23 on the upper side (the −Y direction indicated by the arrow EX23) to be a position Pb(x2, y1−Δy). In addition, the image enlargement processing unit 414*b*1 enlarges the pre-enlargement display element at a position closer to the end portion E24 on the lower side (a position corresponding to the display element Af23 in the first image V21) of the pre-enlargement image V22*a* than the position Pf(x2, y2), which is the enlargement center position, in such a manner as to get close to the end portion E24 on the lower side to generate the display element Ab23 after enlargement. The center coordinate of the display element Ab23 shifts in a direction from the position Pb(x2, y3), which is the center coordinate of the pre-enlargement display element, toward the end portion E24 on the lower side (the Y direction indicated by the arrow EX24) to be a position Pb(x2, y3+Δy).

In addition, the image enlargement processing unit 414*b*1 enlarges the pre-enlargement display element at a position closer to the end portion E21 on the right side and the end portion E23 on the upper side (a position corresponding to the display element Af31 in the first image V21) of the pre-enlargement image V22*a* than the position Pf(x2, y2), which is the enlargement center position, in such a manner as to get close to the end portion E21 on the right side and the end portion E23 on the upper side to generate the display element Ab31 after enlargement. The center coordinate of the display element Ab31 shifts in a direction from the position Pb(x3, y1), which is the center coordinate of the pre-enlargement display element, toward the end portion E21 on the right side and the end portion E23 on the upper side (the X direction indicated by the arrow EX21 and the −Y direction indicated by the arrow EX23) to be a position Pb(x3+Δx, y1−Δy). In addition, the image enlargement processing unit 414*b*1 enlarges the pre-enlargement display element at a position closer to the end portion E21 on the right side (a position corresponding to the display element Af32 in the first image V21) of the pre-enlargement image V22*a* than the position Pf(x2, y2), which is the enlargement center position, in such a manner as to get close to the end portion E21 on the right side to generate the display element Ab32 after enlargement. The center coordinate of the display element Ab32 shifts in a direction from the position Pb(x3, y2), which is the center coordinate of the pre-enlargement display element, toward the end portion E21 on the right side (the X direction indicated by the arrow EX21) to be a position Pb(x3+Δx, y2).

In this manner, the image enlargement processing unit 414*b*1 can obtain the second image V22 by enlarging the pre-enlargement image V22*a* by the enlargement ratio α around the position Pb(x2, y2), which is an example of the enlargement center position.

Figure 14:
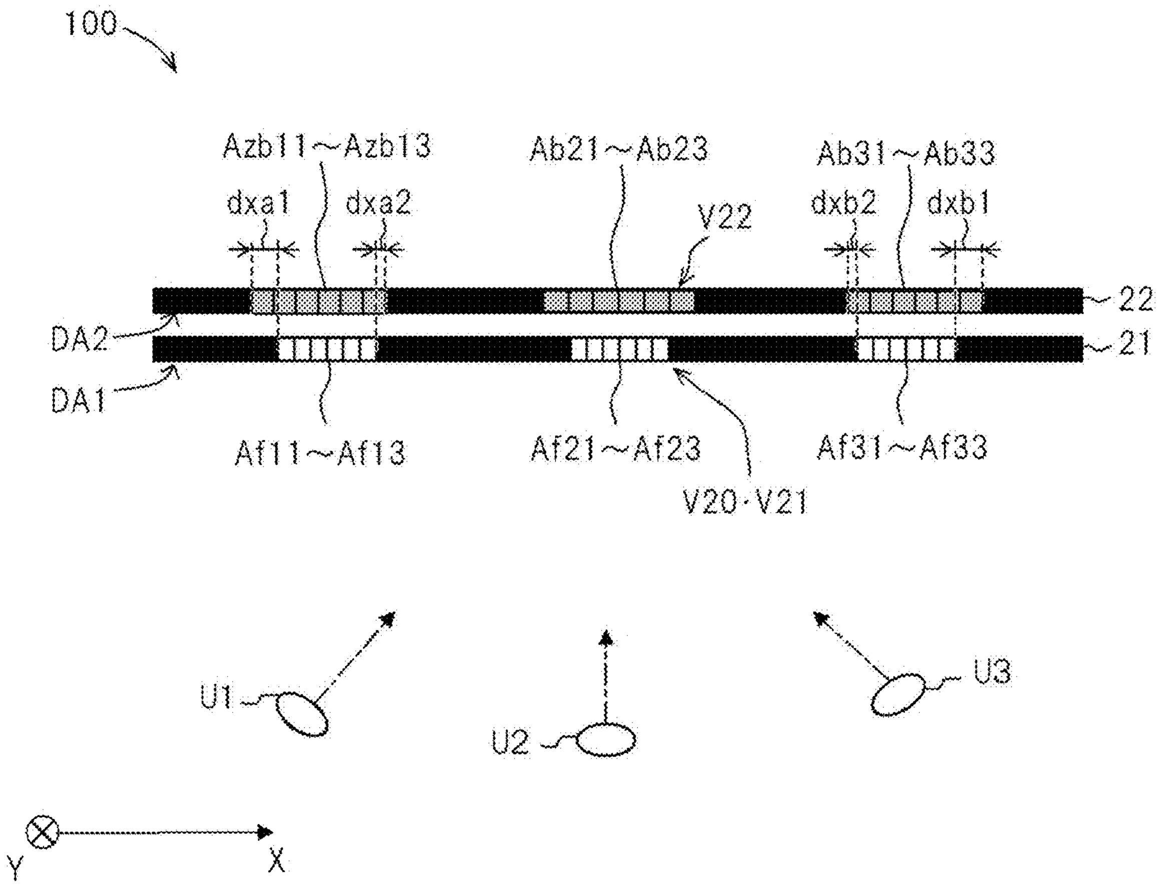
FIG. 14 is a schematic diagram of the liquid crystal display device being viewed by a user, according to the first embodiment, as viewed from above.

FIG. 14 is a schematic diagram of the liquid crystal display device 100 being viewed by a user, according to the first embodiment, as viewed from above. As illustrated in FIG. 14, the first image V21 displayed on the first liquid crystal panel 21 provided on the front surface side and the second image V22 displayed on the second liquid crystal panel 22 provided on the rear surface side overlap each other, and the overlapping image V20 is visually recognized by the user. The user U2 is assumed to be viewing the image V20 displayed in the display region DA1 from the normal direction passing through the center point, in the display region DA1 in the liquid crystal display device 100. The user U1 is assumed to be located in the left direction (the −X direction) with respect to the center point in the display region DA1 of the liquid crystal display device 100 and viewing the image V20 displayed in the display region DA1 in a diagonal direction from the left front toward the center of the display region DA1. The user U3 is assumed to be located in the right direction (the X direction) with respect to the center point in the display region DA1 of the liquid crystal display device 100 and viewing the image V20 displayed in the display region DA1 in a diagonal direction from the right front to the center of the display region DA1.

Figure 15:
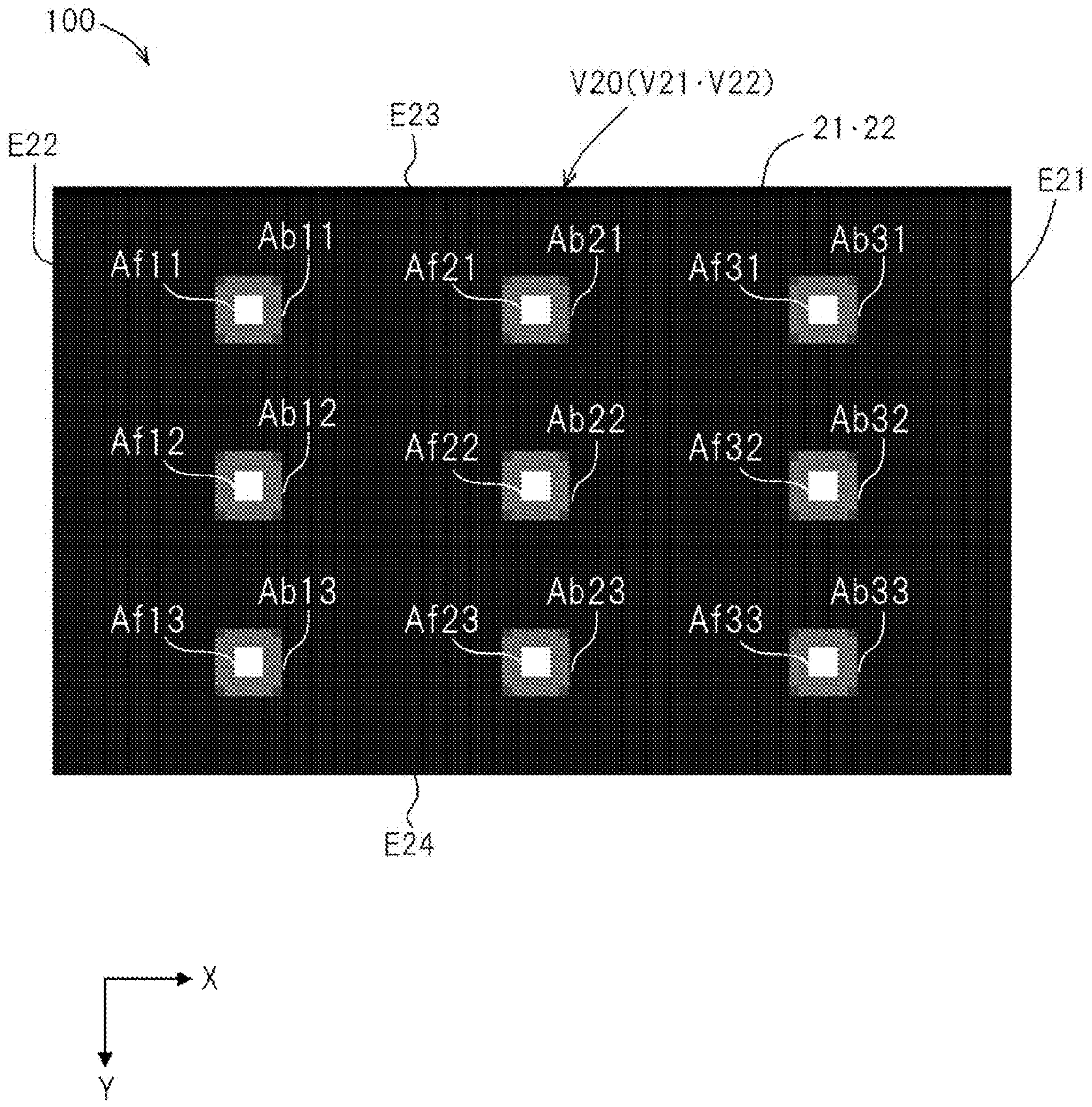
FIG. 15 is a diagram illustrating a state of appearance of an image in which the first image and the second image overlap each other when the display region of the liquid crystal display device according to the first embodiment is seen in a normal direction passing through a center point of the display region.
Figure 16:
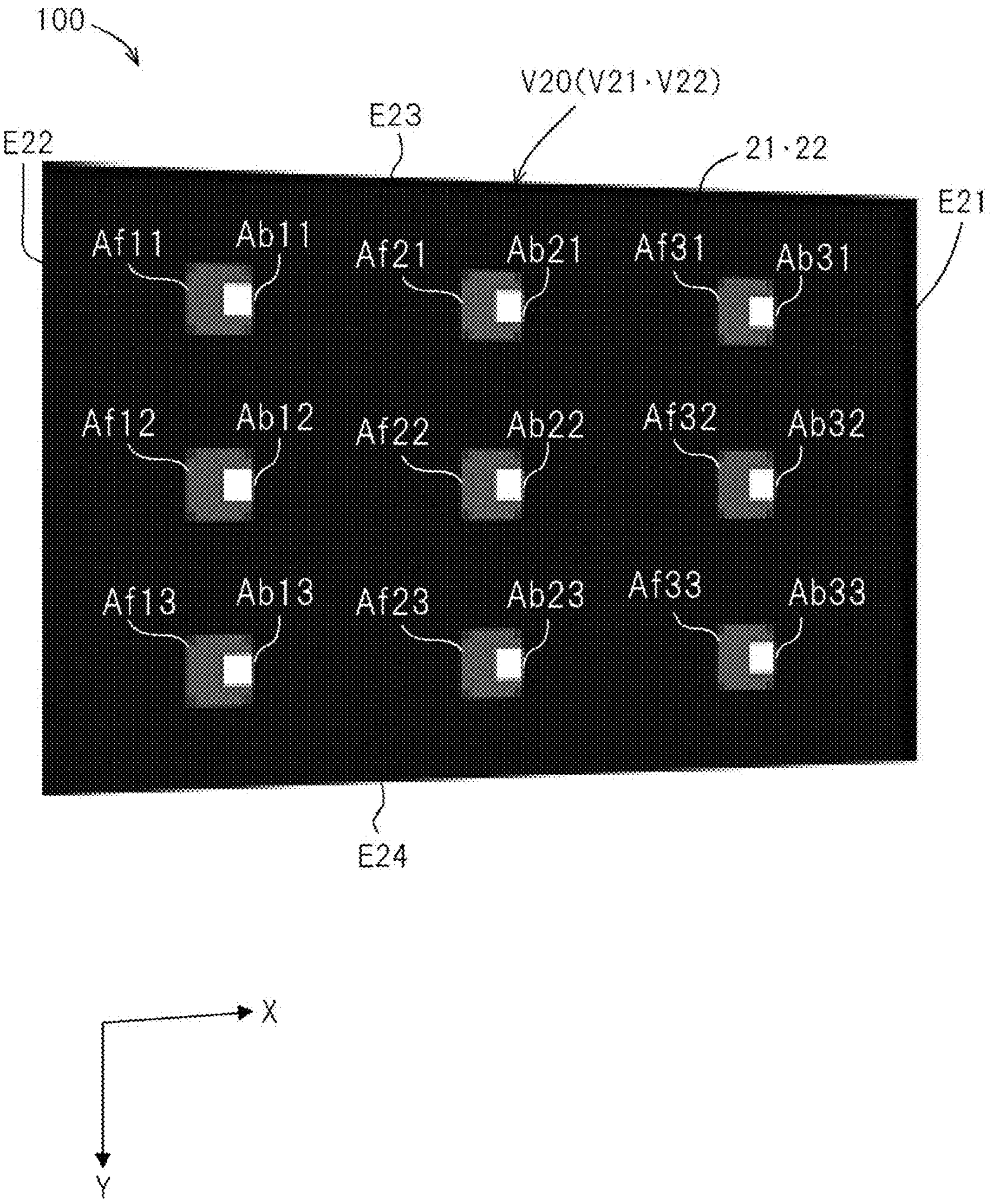
FIG. 16 is a diagram illustrating a state of appearance of the image in which the first image and the second image overlap each other when the display region of the liquid crystal display device according to the first embodiment is seen from the left front in a diagonal direction.
Figure 17:
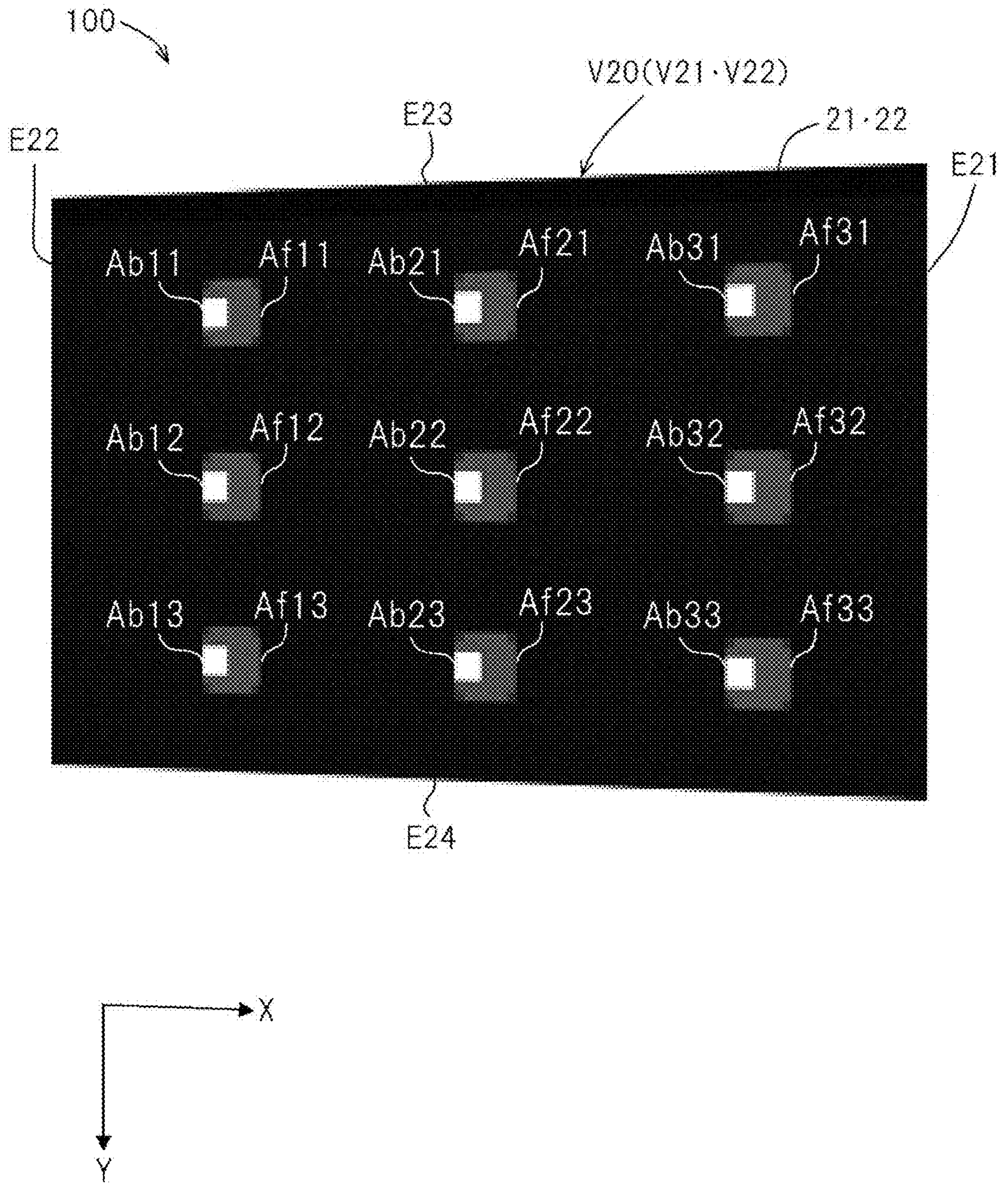
FIG. 17 is a diagram illustrating a state of appearance of the image in which the first image and the second image overlap each other when the display region of the liquid crystal display device according to the first embodiment is seen from the right front in a diagonal direction.

FIG. 15 is a diagram illustrating a state of appearance of the image V20 in which the first image V21 and the second image V22 overlap each other when the display region DA1 of the liquid crystal display device 100 is seen in the normal direction passing through the center point of the display region DA1, according to the first embodiment. FIG. 16 is a diagram illustrating a state of appearance of the image V20 in which the first image V21 and the second image V22 overlap each other when the display region DA1 of the liquid crystal display device 100 is seen in a diagonal direction from the left front, according to the first embodiment. FIG. 17 is a diagram illustrating a state of appearance of the image V20 in which the first image V21 and the second image V22 overlap each other when the display region DA1 of the liquid crystal display device 100 is seen in a diagonal direction from the right front, according to the first embodiment.

In other words, FIG. 15 illustrates a state of appearance of the image V20 in which the first image V21 and the second image V22 overlap each other when the user U2 illustrated in FIG. 14 sees the display region DA1 of the liquid crystal display device 100. In addition, FIG. 16 illustrates a state of appearance of the image V20 in which the first image V21 and the second image V22 overlap each other when the user U1 illustrated in FIG. 14 sees the display region DA1 of the liquid crystal display device 100. FIG. 17 illustrates a state of appearance of the image V20 in which the first image V21 and the second image V22 overlap each other when the user U3 illustrated in FIG. 14 sees the display region DA1 of the liquid crystal display device 100.

When the user U2 sees the image V20 displayed in the display region DA1 from the front as illustrated in FIGS. 14 and 15, when the user U1 sees the image V20 displayed in the display region DA1 from the left front in a diagonal direction as illustrated in FIGS. 14 and 16, or when the user U3 sees the image V20 displayed in the display region DA1 from the right front in a diagonal direction as illustrated in FIGS. 14 and 17, the display elements Ab11 to Ab13, Ab21 to Ab23, and Ab31 to Ab33 in the second image V22 are displayed in such a manner as to surround the peripheries of the display elements Af11 to Af13, Af21 to Af23, and Af31 to Af33 in the first image V21, respectively, and in any case, the display elements Af11 to Af13, Af21 to Af23, and Af31 to Af33 in the first image V21 are displayed without protruding from the display elements Ab11 to Ab13, Ab21 to Ab23, and Ab31 to Ab33 in the second image V22.

In this manner, the liquid crystal display device 100 enlarges the second image V22 displayed on the second liquid crystal panel 22, which is the back panel, as compared to the first image V21 displayed on the first liquid crystal panel 21, which is the front panel. Thus, as compared to a dual liquid crystal panel in which an image to be displayed on the back panel side is not enlarged, when seen by the user U2 from the front (see FIGS. 14 and 15), when seen by the user U1 from the left front (see FIG. 14 and FIG. 16), or when seen by the user U3 from the right front (see FIGS. 14 and 17), the image V20 can be prevented from becoming an image in which each of the display elements Af11 to Af13, Af21 to Af23, and Af31 to Af33 in the first image V21 is partially deficient, so that reduction in display quality can be suppressed.

In addition, as illustrated in FIGS. 10 to 13, with the image enlargement processing unit 414*b*1 included in the liquid crystal display device 100 according to the first embodiment, the second image V22 to be displayed on the second liquid crystal panel 22 is generated by enlarging the pre-enlargement image V22*a* from the position Pb(x2, y2), which is an example of the predetermined enlargement center position, to the end portions E21*b* to E24*b* of the second liquid crystal panel 22.

Thus, as compared to a case where all pre-enlargement display elements are enlarged around the center coordinate by a constant enlargement ratio in the X direction, the −X direction, the Y direction, and the −Y direction to generate the display elements Azb11 to Azb13, Azb21 to Azb23, and Azb31 to Azb33 after enlargement, like the liquid crystal display device 200 according to the comparative example described with reference to FIG. 4 to FIG. 9, the image enlargement processing unit 414*b*1 according to the first embodiment can suppress excessive enlargement of the display elements. That is, with the image enlargement processing unit 414*b*1 according to the first embodiment, it is possible to prevent the areas of the display elements Ab11 to Ab13, Ab21 to Ab23, and Ab31 to Ab33 included in the second image V22 after enlargement from being too wide with respect to the areas of the display elements Af11 to Af13, Af21 to Af23, and Af31 to Af33 included in the first image V21. This reduces the areas of regions around the display elements Af11 to Af13, Af21 to Af23, and Af31 to Af33 in the first image V21 overlapping the display elements Ab11 to Ab13, Ab21 to Ab23, and Ab31 to Ab33, so that it is possible to suppress reduction in contrast of the image around the display elements Af11 to Af13, Af21 to Af23, and Af31 to Af33. As a result, it is possible to suppress reduction in contrast of the entire image V20 in which the first image V21 and the second image V22 overlap each other.

In other words, it can be said that a display method according to the first embodiment includes a step of displaying the first image V21 on the first liquid crystal panel 21, a step of displaying the second image V22 synchronized with the first image V21 on the second liquid crystal panel 22 facing the rear surface of the first liquid crystal panel 21, and a step of enlarging the second image V22 from the position Pb(x2, y2), which is an example of the predetermined enlargement center position in the second liquid crystal panel 22, toward at least any one of the end portions E21*b* to E24*b* of the second liquid crystal panel 22.

Note that with reference to FIGS. 10 to 13, an example in which the image enlargement processing unit 414*b*1 enlarges the pre-enlargement image V22*a* from a predetermined enlargement center position in four directions toward the end portions E21*b* to E24*b* of the second liquid crystal panel 22 to generate the second image V22 has been described. However, this is not a limitation, and the image enlargement processing unit 414*b*1 may enlarge the pre-enlargement image V22*a* from the predetermined enlargement center position toward at least one end portion of the end portions E21*b* to E24*b* of the second liquid crystal panel 22 to generate the second image V22. This can also sufficiently display the image in which the first image V21 is not partially deficient depending on a change in the viewing position from a user viewing the image V20 in which the first image V21 and the second image V22 overlap each other. In addition, it is possible to suppress a partial drop in contrast of the image to be displayed.

Furthermore, the image enlargement processing unit 414*b*1 enlarges the pre-enlargement image V22*a* in such a manner that positions of the pre-enlargement display elements Ab11*a*, Ab33*a*, and the like, which are partial regions closer to at least one end portion of the end portions E21 to E24 than the position Pf(x2, y2), which is an example of the predetermined enlargement center position, of the pre-enlargement image V22*a* before enlargement of the second image V22, get close to at least one end portion, thereby generating the second image V22.

For example, as described with reference to FIGS. 10 and 12, the image enlargement processing unit 414*b*1 enlarges the pre-enlargement image V22*a* in such a manner that the position of the pre-enlargement display element Ab11*a*, which is a partial region closer to the end portion E22 on the left side and the end portion E23 on the upper side than the position Pf(x2, y2), which is an example of the predetermined enlargement center position, of the pre-enlargement image V22*a* before enlargement of the second image V22, gets close to the end portion E22 on the left side and the end portion E23 on the upper side, thereby generating the second image V22. Further, for example, as described with reference to FIGS. 10 and 13, the image enlargement processing unit 414*b*1 enlarges the pre-enlargement image V22*a* in such a manner that the position of the pre-enlargement display element Ab33*a*, which is a partial region closer to the end portion E21 on the right side and the end portion E24 on the lower side than the position Pf(x2, y2), which is an example of the predetermined enlargement center position, of the pre-enlargement image V22*a* before enlargement of the second image V22, gets close to the end portion E21 on the right side and the end portion E24 on the lower side, thereby generating the second image V22.

Thus, the image enlargement processing unit 414*b*1 can enlarge the display elements Ab11 to Ab13, Ab21 to Ab23, and Ab31 to Ab33 included in the second image V22 while suppressing excessive enlargement. As a result, it is possible to suppress reduction in contrast of the image V20 in which the first image V21 and the second image V22 overlap each other.

For example, as an example of how the image enlargement processing unit 414*b*1 brings the position of a display element, which is closer to at least one end portion than the predetermined enlargement center position, close to the at least one end portion, when generating the second image V22 by enlargement, the image enlargement processing unit 414*b*1 may perform enlargement in such a manner that when the first image V21 and the second image V22 overlap each other, as to a distance between each end portion (the end portion on the right side, the end portion on the left side, the end portion on the upper side, and the end portion on the lower side when seen from the front) defining each of the display elements Af11 to Af13, Af21, Af23, and Af31 to Af33 included in the first image V21 and each end portion (the end portion on the right side, the end portion on the left side, the end portion on the upper side, and the end portion on the lower side when seen from the front) defining each of the display elements Ab11 to Ab13, Ab21, Ab23, and Ab31 to Ab33 after enlargement, a distance (a distance dxa1 and a distance dxb1 illustrated in FIG. 14) between end portions located in the enlargement direction of the second image V22 is greater than a distance (a distance dxa2 and a distance dxb2 illustrated in FIG. 14) between end portions located on a side opposite to the enlargement direction of the second image V22 (distance dxa1>distance dxa2, distance dxb1>distance dxb2). In addition, the image enlargement processing unit 414*b*1 may enlarge the second image V22 in such a manner that among end portions of display elements overlapping each other, distances (the distance dxa2 and the distance dxb2 illustrated in FIG. 14) between end portions located on the side opposite to the enlargement direction of the second image V22 overlap (distance dxa2=0, distance dxb2=0).

In addition, with reference to FIGS. 10 to 17, there has been described an example in which the image enlargement processing unit 414*b*1 enlarges only the central pre-enlargement display element Ab22*a* of the plurality of pre-enlargement display elements included in the pre-enlargement image V22*a* around the position Pb(x2, y2), which is the center coordinate, in the X direction, the −X direction, the Y direction, and the −Y direction, and enlarges the pre-enlargement image V22*a* in such a manner that all pre-enlargement display elements other than the pre-enlargement display element Ab22*a* get close to at least one end portion of the end portions E21 to E24. However, this is not a limitation, and the image enlargement processing unit 414*b*1 may appropriately change the number of pre-enlargement display elements to be enlarged around the center coordinate in the X direction, the −X direction, the Y direction, and the −Y direction among the plurality of pre-enlargement display elements included in the pre-enlargement image V22*a* and positions thereof in the pre-enlargement image V22*a*, and the number of pre-enlargement images to be enlarged in such a manner as to get close to at least one near end portion of the end portions E21 to E24 and positions thereof in the pre-enlargement image V22*a*.

For example, as illustrated in FIG. 10, the image enlargement processing unit 414*b*1 may enlarge the pre-enlargement display elements, which are to be the display elements Ab21 to Ab23 aligned in the Y direction in the central region, around the center coordinate in the X direction, the −X direction, the Y direction, and the −Y direction, enlarge the pre-enlargement display elements, which are to be the display elements Ab11 to Ab13 aligned in the Y direction in the region on the left side, in a direction toward the end portion E22 (−X direction), and enlarge the pre-enlargement display elements, which are to be the display elements Ab31 to Ab33 aligned in the Y direction in the region on the right side, in a direction toward the end portion E21 (X direction). This can also sufficiently achieve an effect of suppressing reduction in contrast of the entire image V20 in which the first image V21 and the second image V22 overlap each other.

Furthermore, the image enlargement processing unit 414*b*1 may enlarge the pre-enlargement image V22*a* before enlarging isotropically from the position Pf(x2, y2), which is an example of the predetermined enlargement center position, in both the horizontal direction (plus-minus X direction) and the vertical direction (plus-minus Y direction) in the display region DA2 of the second liquid crystal panel 22, thereby generating the second image V22. Note that enlarging isotropically means enlarging by the same distance or the same enlargement ratio $\alpha$ in the X direction, the −X direction, the Y direction, and the −Y direction, and for example, $\Delta x=\Delta y$ illustrated in FIGS. 10 to 12 is satisfied. As a result, the image enlargement processing unit 414*b*1 can prevent an image in which display elements displayed on the first liquid crystal panel 21 are partially deficient from being generated even when a user sees the image V20 displayed in the display region DA1 from any of the diagonally left front, the diagonally right front, the diagonally upper front, and the diagonally lower front, allowing the user to view the image V20 in high display quality in which reduction in contrast is suppressed.

Next, with reference to FIGS. 18 to 29, liquid crystal display devices 100 according to the second to sixth embodiments of the disclosure, which are some modified examples of the liquid crystal display device 100 according to the first embodiment, will be described.

Figure 18:
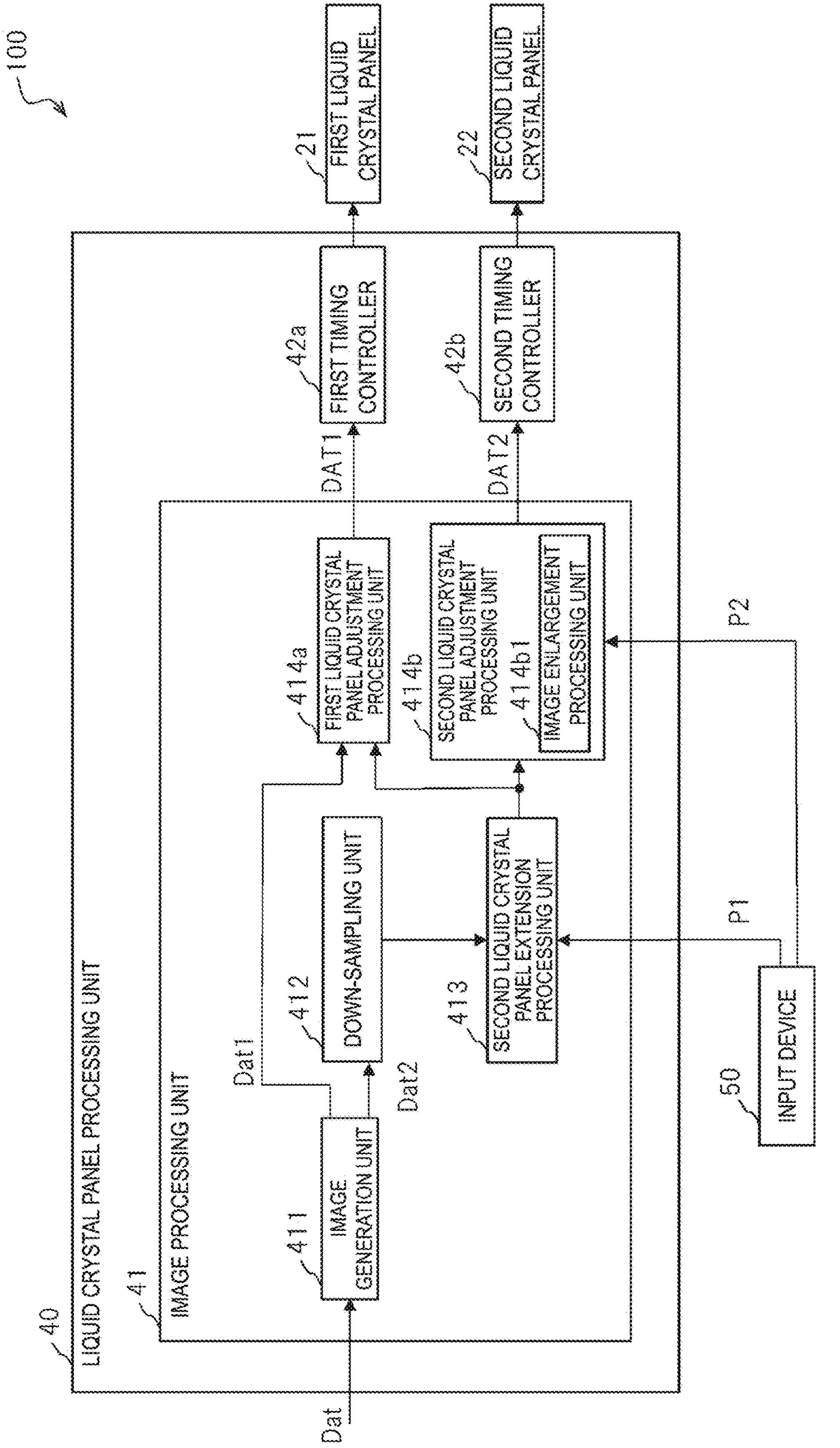
FIG. 18 is a block diagram schematically illustrating a liquid crystal display device according to a second embodiment.

FIG. 18 is a block diagram schematically illustrating a liquid crystal display device 100 according to a second embodiment. As illustrated in FIG. 18, the liquid crystal display device 100 according to the second embodiment may further include an input device 50 in the liquid crystal display device 100 described with reference to FIG. 2 and the like. The input device 50 is a device capable of inputting a parameter (first parameter) P1, which is information for the second liquid crystal panel extension processing unit 413 to perform filtering, to the image processing unit 41, and inputting a parameter (second parameter) P2, which is information for the image enlargement processing unit **414*b*1 to enlarging a pre-enlargement image, to the image processing unit 41**.

Examples of the parameter P1 include a filter coefficient used when the second liquid crystal panel extension processing unit 413 performs filtering. Examples of the parameter P2 include the enlargement ratio α for the image enlargement processing unit **414*b*1 to enlarge the pre-enlargement image. Note that the parameter which the input device 50 can input may be both the parameter P1 and the parameter P2**, or may be only one of these.

When the image processing unit 41 acquires the parameter P1 from the input device 50, the second liquid crystal panel extension processing unit 413 uses a mask coefficient based on the parameter P1 to filter the second image signal Dat2 acquired from the down-sampling unit 412.

When the image processing unit 41 acquires the parameter P2 from the input device 50, the image enlargement processing unit **414*b*1 uses the enlargement ratio α based on the parameter P2 to extend the pre-enlargement image V22*a* based on the second image signal Dat2 acquired from the second liquid crystal panel extension processing unit 413**.

The input device 50 may be a device capable of inputting various types of information by an operation from a user, and any input device such as a keyboard, a mouse, a touch panel, a button, or the like can be used as the input device 50.

As described above, the liquid crystal display device 100 according to the second embodiment includes the input device 50. The input device 50 is a device capable of inputting at least one of the parameter P1, which is information for the second liquid crystal panel extension processing unit 413 to perform filtering, and the parameter P2, which is information for the image enlargement processing unit **414*b*1 to enlarge the pre-enlargement image. This allows a user to change the parameter P1 and the parameter P2, so that the user can adjust the relative positions of the first image V21 and the second image V22. This makes it easy to adjust the positions of the first image V21 and the second image V22 in accordance with a gap between the first liquid panel 21 and the second liquid crystal panel 22**, so that it is possible to further improve the display quality.

Figure 19:
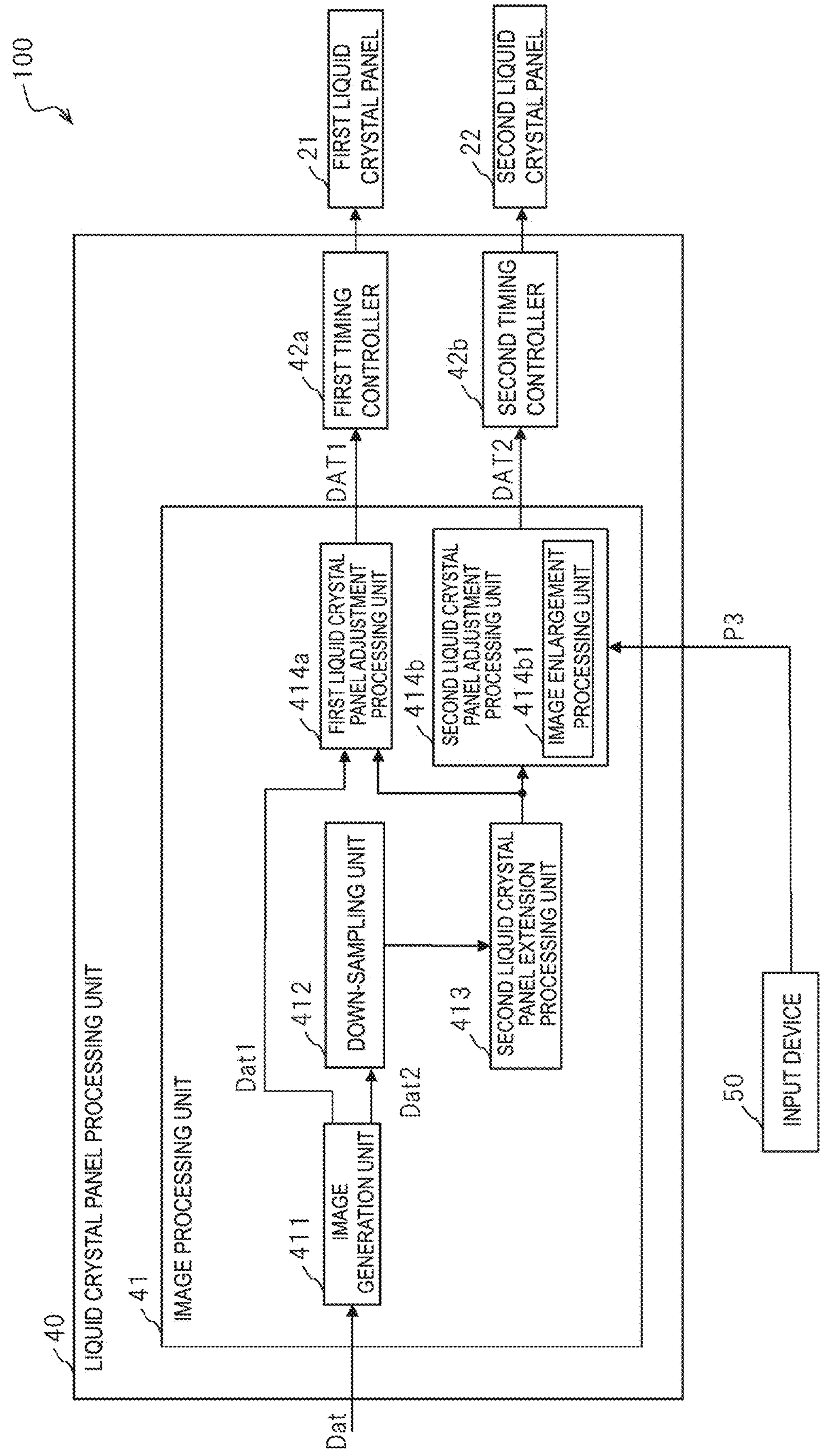
FIG. 19 is a block diagram schematically illustrating a liquid crystal display device according to a third embodiment.

FIG. 19 is a block diagram schematically illustrating a liquid crystal display device 100 according to a third embodiment. An input device 50 included in the liquid crystal display device 100 according to the third embodiment illustrated in FIG. 19 is a device capable of inputting a parameter (third parameter) P3, in place of the parameter P1 and the parameter P2 or in addition to the parameter P1 and the parameter P2 that can be input by the input device 50 described with reference to FIG. 18. The parameter P3 is information for the second liquid crystal panel adjustment processing unit **414*b* to adjust a display position in the display region DA2 of the second image V22**.

For example, the second liquid crystal panel adjustment processing unit **414*b* adjusts the display position in the display region DA2 of the second image V22** using the following Equation (3).

[Equation 3]

$$\text{output}(x, y) = \text{input}\left(\frac{x}{\alpha} - \frac{((\alpha-1)\times sizex)}{2} + posx,\ \frac{y}{\alpha} - \frac{((\alpha-1)\times sizey)}{2} + posy\right) \tag{3}$$

In Equation (3) above, output(x, y) represents a display position of the second image V22 in the X direction and the Y direction in the display region DA2. The parameter P3 input by the input device 50 includes posx and posy as information. Then, the second liquid crystal panel adjustment processing unit **414*b* obtains output(x, y) of Equation (3) above based on posx and posy, which are included as information in the parameter P3 input by the input device 50, to determine the display position of the second image V22 in the X direction and the Y direction in the display region DA2**.

In this manner, the liquid crystal display device 100 according to the third embodiment includes the input device 50 capable of inputting the parameter P3, which is information for adjusting a display position in the display region DA2 of the second image V22. This allows a user to change the parameter P3, so that the user can adjust the display position in the display region DA2. That is, the user can adjust the relative positions of the first image V21 and the second image V22, so that the positions of the first image V21 and the second image V22 can be easily adjusted in accordance with a gap between the first liquid panel 21 and the second liquid crystal panel 22, so that the display quality can be further improved.

Note that, in the input device 50 according to the third embodiment, as in the input device 50 according to the second embodiment, at least one of the parameter P1 and the parameter P2 may be input.

Figure 20:
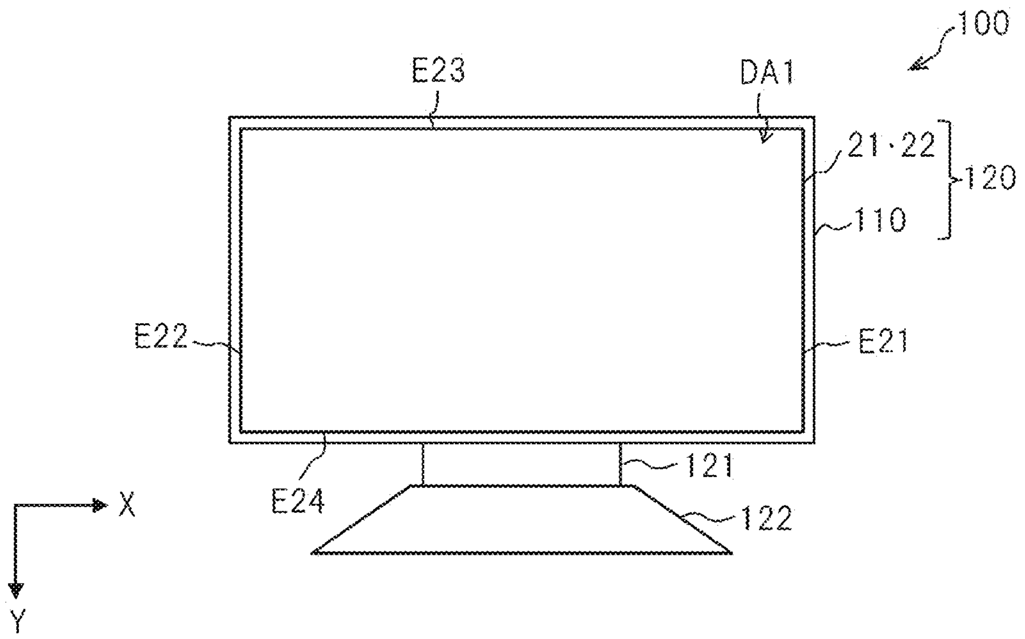
FIG. 20 is a plan view schematically illustrating a liquid crystal display device according to a fourth embodiment.
Figure 21:
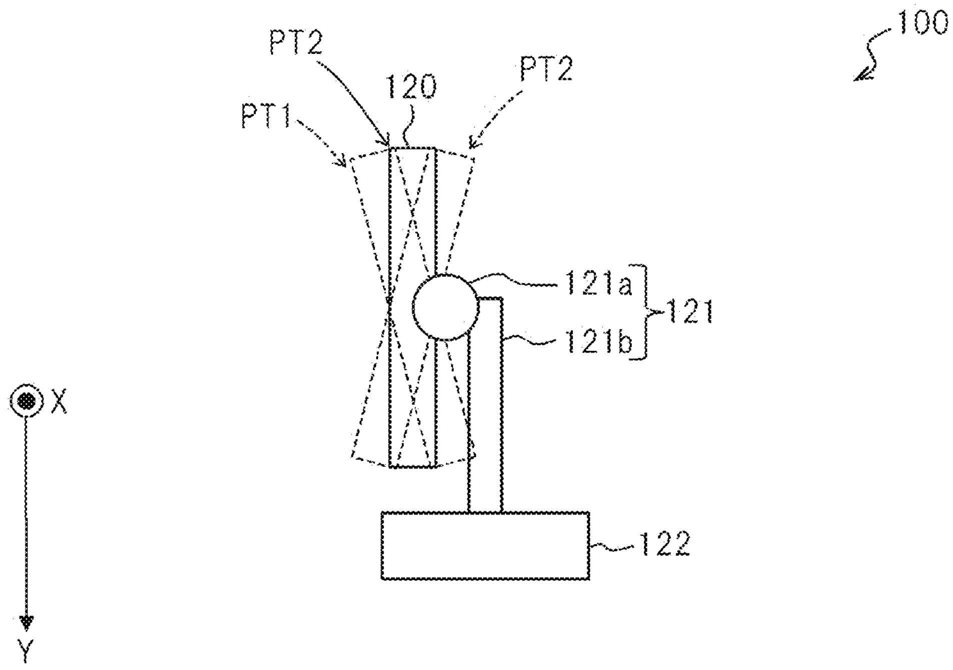
FIG. 21 is a side view schematically illustrating the liquid crystal display device according to the fourth embodiment.

FIG. 20 is a plan view schematically illustrating a liquid crystal display device 100 according to a fourth embodiment. FIG. 21 is a side view schematically illustrating the liquid crystal display device 100 according to the fourth embodiment. As illustrated in FIGS. 20 and 21, the liquid crystal display device 100 according to the fourth embodiment may include an angle adjustment mechanism **121*a* capable of adjusting an angle of the first liquid crystal panel 21 and the second liquid crystal panel 22**.

The liquid crystal display device 100 according to the fourth embodiment includes a display unit 120 including the first liquid crystal panel 21 and the second liquid crystal panel 22, a strut portion 121 that supports the display unit 120, and a base portion 122 that is a base on which the strut portion 121 is supported. The display unit 120 includes the first liquid crystal panel 21, the second liquid crystal panel 22, and a housing 110 that houses the first liquid crystal panel 21 and the second liquid crystal panel 22. The strut portion 121 includes the angle adjustment mechanism **121*a* and a column portion 121*b*. Of the column portion 121*b*, the bottom is connected to the base portion 122, and the angle adjustment mechanism 121*a* is provided on the top. The column portion 121*b* supports the display unit 120 with the angle adjustment mechanism 121*a*** interposed therebetween.

The angle adjustment mechanism 121*a* rotatably supports the display unit 120 around a rotational axis parallel to the X direction, for example. The angle adjustment mechanism 121*a* may be manually moved by a user to change an angle of the display unit 120 supported by the angle adjustment mechanism 121*a*, and for example, the image enlargement processing unit 414*b*1 may control an angle of the angle adjustment mechanism 121*a* in accordance with the second image V22.

For example, as illustrated in FIG. 21, a position where the display region DA1 of the display unit 120 faces forward in a diagonally downward direction is defined as a first position PT1, a position where the display region DA1 of the display unit 120 faces forward in a substantially horizontal direction is defined as a second position PT2, and a position where the display region DA1 of the display unit 120 faces forward in a diagonally upward direction is defined as a third position PT3.

Figure 22:
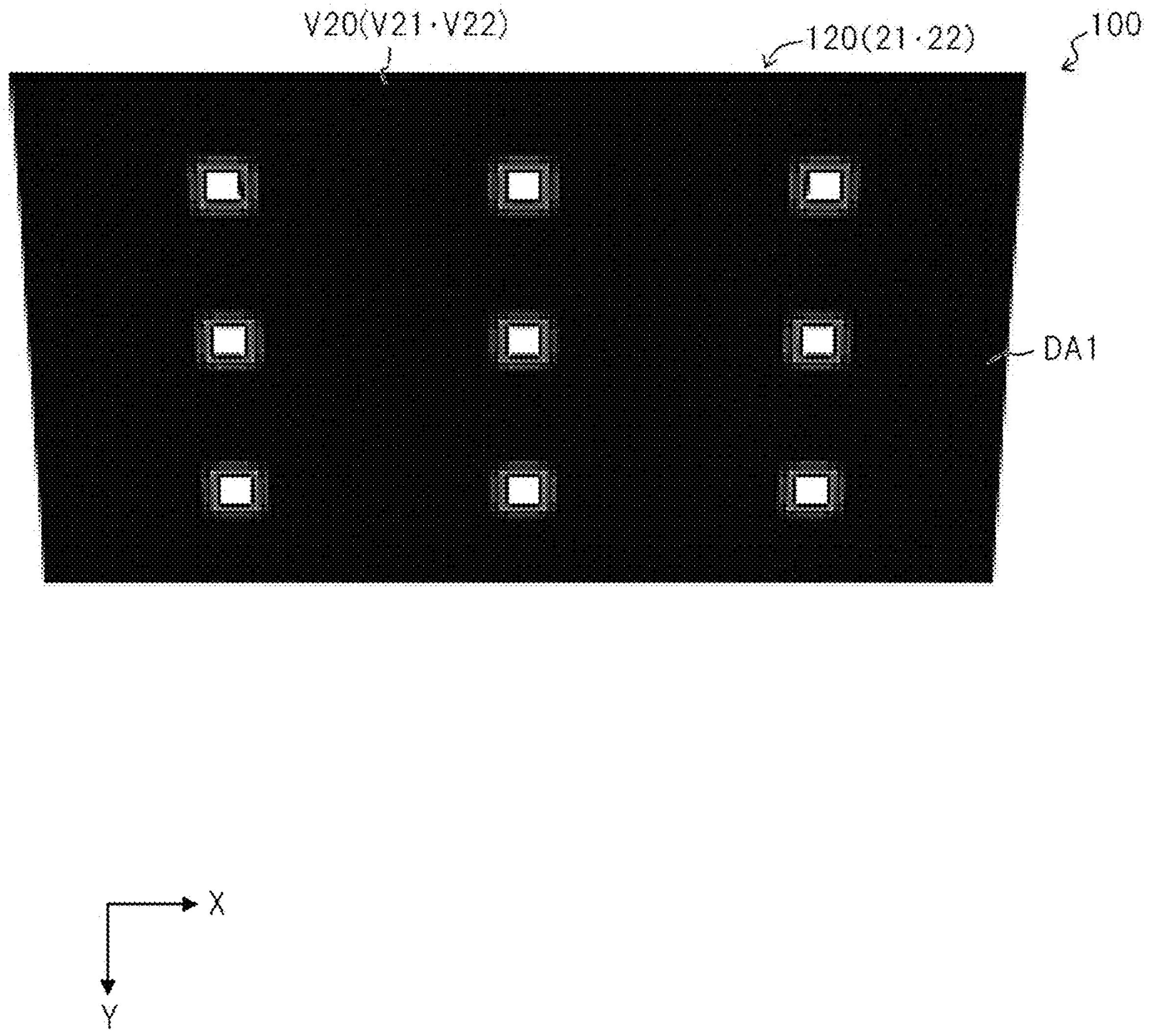
FIG. 22 is a diagram illustrating a state of appearance of an image when a display unit is seen in a horizontal direction with the display unit at a first position in the liquid crystal display device according to the fourth embodiment.
Figure 23:
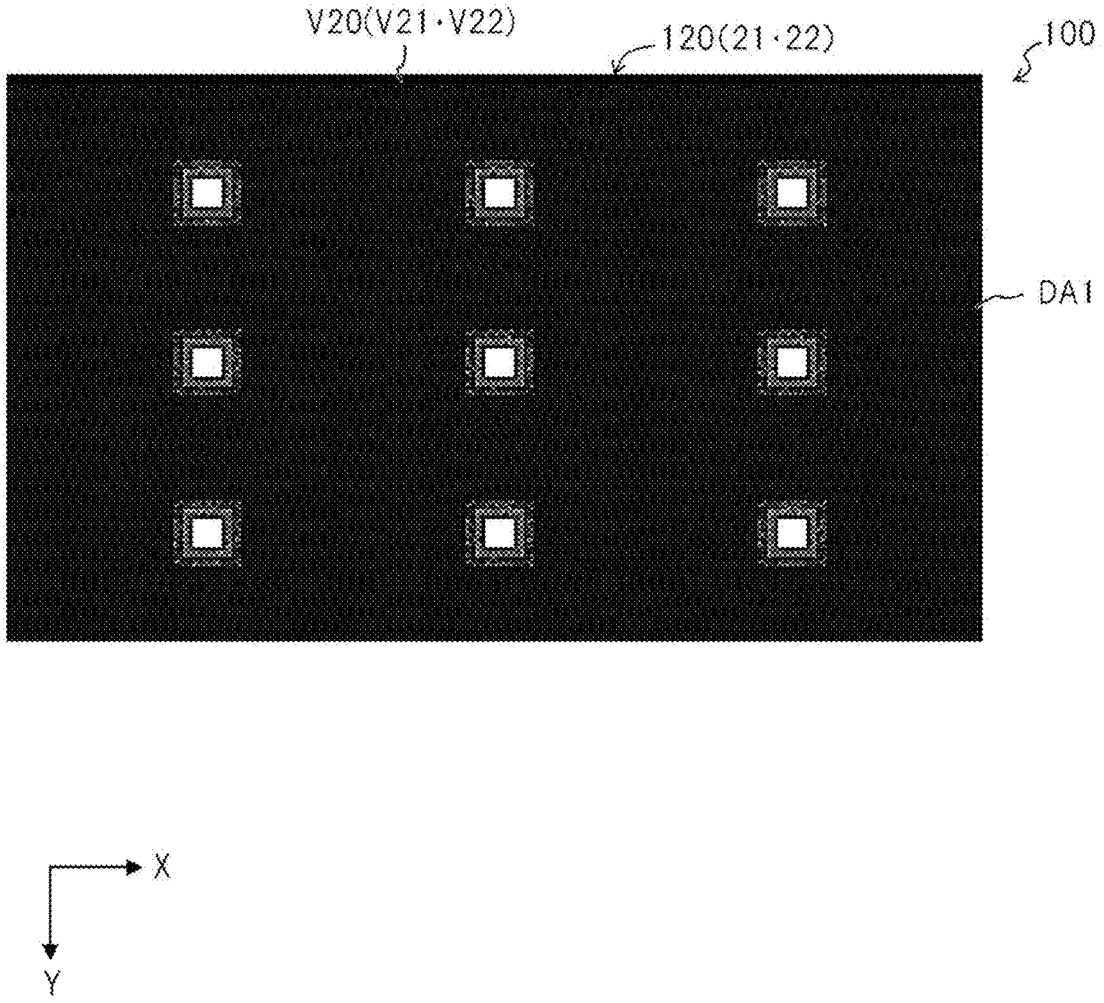
FIG. 23 is a diagram illustrating a state of appearance of the image when the display unit is seen in the horizontal direction with the display unit at a second position in the liquid crystal display device according to the fourth embodiment.
Figure 24:
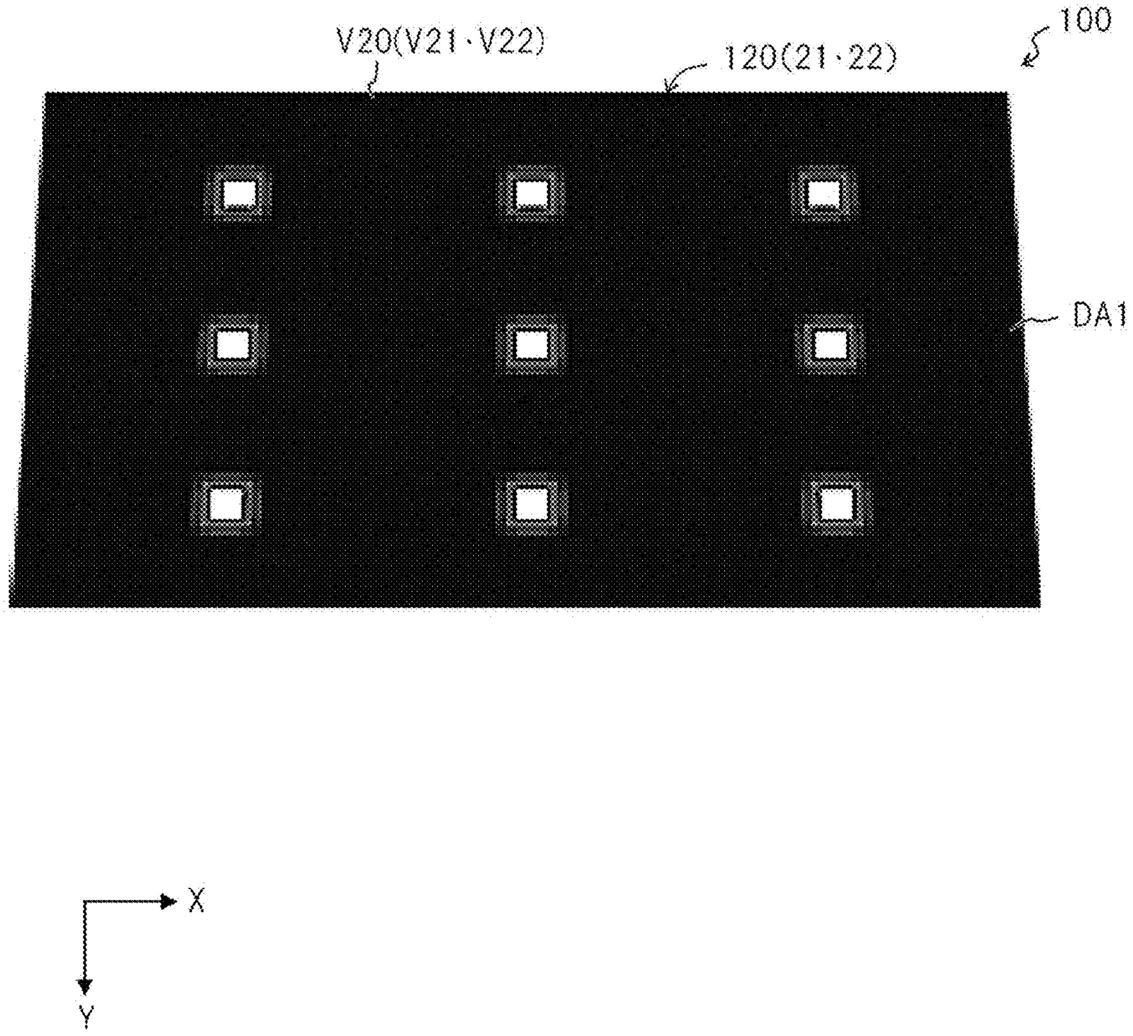
FIG. 24 is a diagram illustrating a state of appearance of the image when the display unit is seen in the horizontal direction with the display unit at a third position in the liquid crystal display device according to the fourth embodiment.

FIG. 22 is a diagram illustrating a state of appearance of the image V20 when the display unit 120 is seen in the horizontal direction when the display unit 120 is at the first position PT1 in the liquid crystal display device 100 according to the fourth embodiment. FIG. 23 is a diagram illustrating a state of appearance of the image V20 when the display unit 120 is seen in the horizontal direction when the display unit 120 is at the second position PT2 in the liquid crystal display device 100 according to the fourth embodiment. FIG. 24 is a diagram illustrating a state of appearance of the image V20 when the display unit 120 is seen in the horizontal direction when the display unit 120 is at the third position PT3 in the liquid crystal display device 100 according to the fourth embodiment.

For example, in accordance with the angle with which the user sees the image V20 displayed on the display unit 120, the angle adjustment mechanism 121*a* can adjust the angle of the display unit 120.

For example, in a case where the user sees the display unit 120 from the diagonally lower front, the angle adjustment mechanism 121*a* adjusts the angle of the display unit 120 by an instruction from the image enlargement processing unit 414*b*1 or by manual operation of the user in such a manner that the display unit 120 is at the first position PT1, that is, the display region DA1 of the display unit 120 faces forward in the diagonally downward direction, as illustrated in FIG. 22. Furthermore, for example, in a case where the user sees the display unit 120 from the front in the substantially horizontal direction, the angle adjustment mechanism 121*a* adjusts the angle of the display unit 120 by an instruction from the image enlargement processing unit 414*b*1 or by manual operation of the user in such a manner that the display unit 120 is at the second position PT2, that is, the display region DA1 of the display unit 120 faces forward in the substantially horizontal direction, as illustrated in FIG. 23. Furthermore, for example, in a case where the user sees the display unit 120 from the diagonally upper front, the angle adjustment mechanism 121*a* adjusts the angle of the display unit 120 by an instruction from the image enlargement processing unit 414*b*1 or by manual operation of the user in such a manner that the display unit 120 is at the third position PT3, that is, the display region DA1 of the display unit 120 faces forward in the diagonally upward direction, as illustrated in FIG. 24.

As described above, the liquid crystal display device 100 according to the fourth embodiment includes the angle adjustment mechanism 121*a* capable of adjusting the angles of the first liquid crystal panel 21 and the second liquid crystal panel 22. Accordingly, the angle adjustment mechanism 121*a* can adjust the angles of the first liquid crystal panel 21 and the second liquid crystal panel 22 in accordance with the angle with which the user sees the image V20 displayed in the display region DA1. This can narrow a range of the angle with which the user sees the display region DA1. As a result, it is possible to provide, to the viewer, the image V20 in which reduction in contrast is further suppressed.

Note that the image enlargement processing unit 414*b*1 may set a predetermined enlargement center position in accordance with the angles of the first liquid crystal panel 21 and the second liquid crystal panel 22 adjusted by the angle adjustment mechanism 121*a*, and generate the second image V22.

Furthermore, the liquid crystal display device 100 according to the fourth embodiment may also include at least one input device (FIGS. 18, 19) capable of inputting at least one of the parameter P1, the parameter P2, and the parameter P3.

In addition, for example, in a case where the liquid crystal display device 100 according to the fourth embodiment includes the input device 50 capable of inputting the parameter P3 (FIG. 19), the angle adjustment mechanism 121*a* may select an angle (e.g., any of the first position PT1, the second position PT2, or the third position PT3) with which the display unit 120 is supported, in accordance with the value of posy of Equation (3) above.

Figure 25:
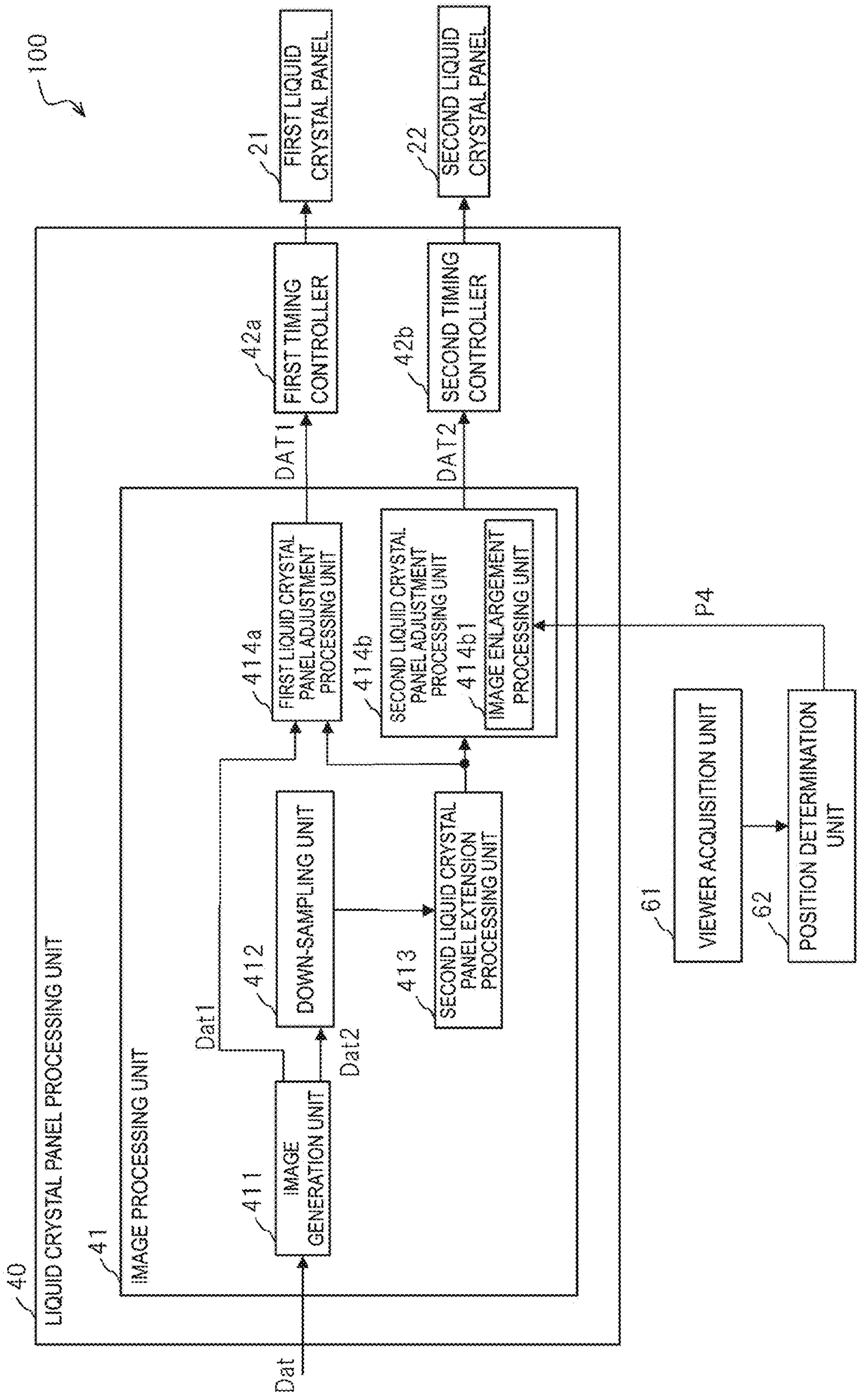
FIG. 25 is a block diagram schematically illustrating a liquid crystal display device according to a fifth embodiment.

FIG. 25 is a block diagram schematically illustrating a liquid crystal display device 100 according to a fifth embodiment. As illustrated in FIG. 25, the liquid crystal display device 100 according to the fifth embodiment includes a viewer acquisition unit 61 and a position determination unit 62.

The viewer acquisition unit 61 acquires information indicating a presence of a user who is viewing the image V20 displayed by the liquid crystal display device 100. The viewer acquisition unit 61 can be, for example, an image capturing device capable of capturing an image of a user as information indicating a presence of the user. The position determination unit 62 determines, based on the image captured by the viewer acquisition unit 61, a viewing position from the liquid crystal display device 100 (e.g., a distance and an angle from the liquid crystal display device 100) from which the user is viewing the image V20. Then, the position determination unit 62 generates a parameter P4 that is information indicating the determined viewing position of the user, and outputs the parameter P4 to the image enlargement processing unit 414*b*1.

The image enlargement processing unit 414*b*1 sets a predetermined enlargement center position based on the viewing position of the user indicated by the parameter P4, and enlarges the pre-enlargement image V20*a* around the predetermined enlargement center position, which has been set, to generate the second image V22.

Figure 26:
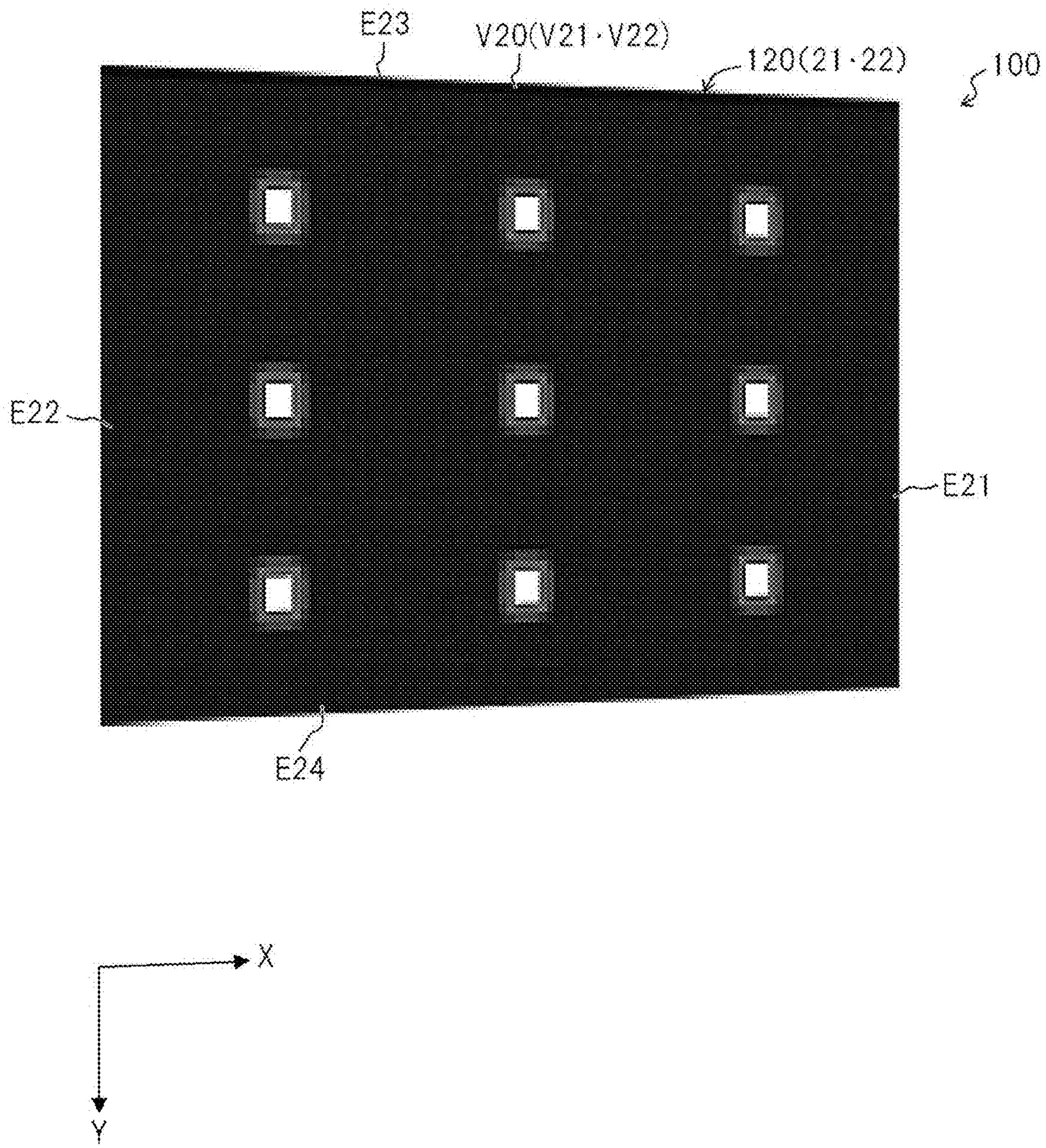
FIG. 26 is a diagram illustrating a state of appearance of an image when a display region of the liquid crystal display device according to the fifth embodiment is seen from the left front in a diagonal direction.
Figure 27:
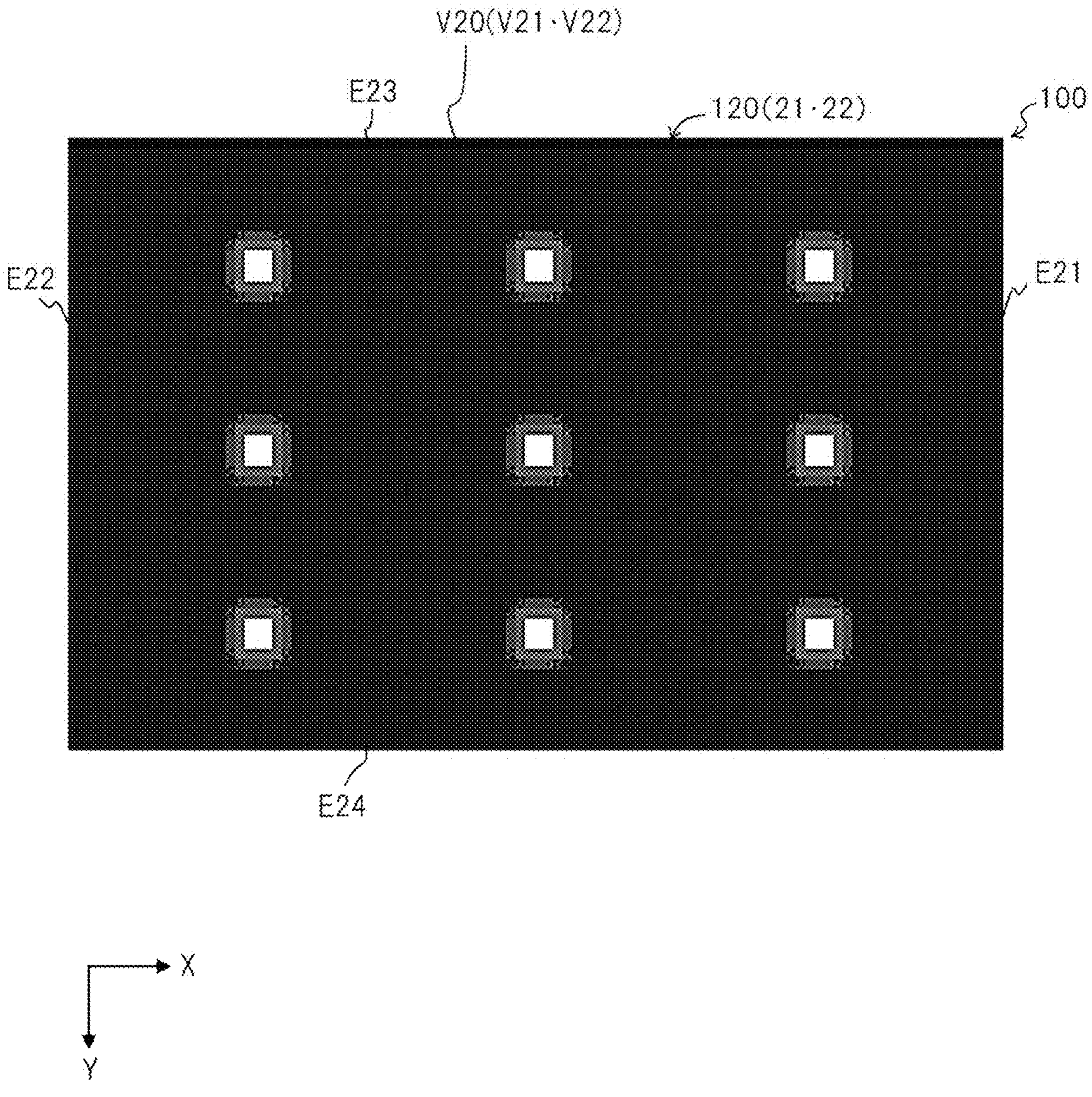
FIG. 27 is a diagram illustrating a state of appearance of the image when the display region of the liquid crystal display device according to the fifth embodiment is seen in a normal direction passing through a center point of the display region.
Figure 28:
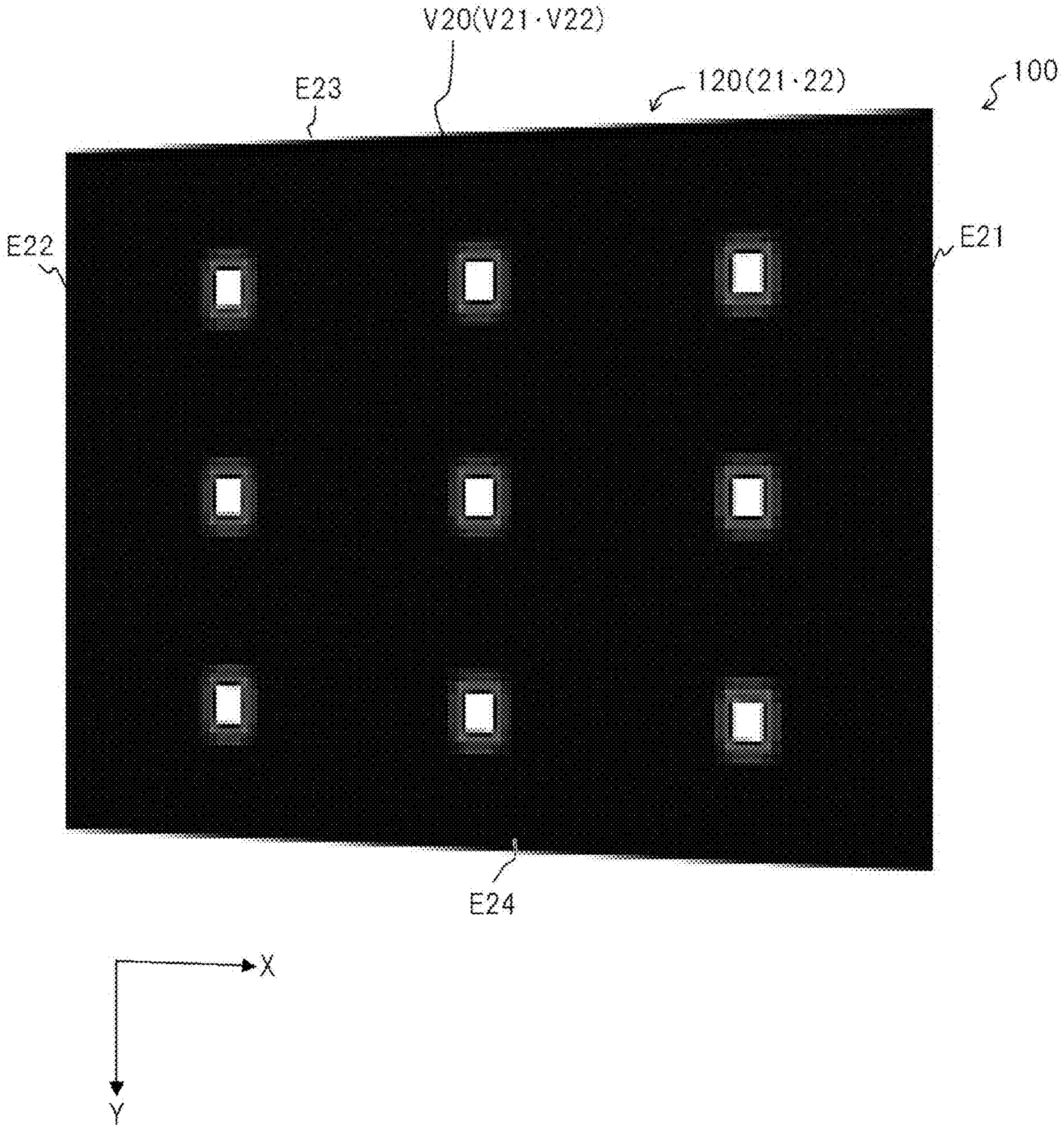
FIG. 28 is a diagram illustrating a state of appearance of the image when the display region of the liquid crystal display device according to the fifth embodiment is seen from the right front in a diagonal direction.

FIG. 26 is a diagram illustrating a state of appearance of the image V20 when the display region DA1 of the liquid crystal display device 100 according to the fifth embodiment is seen from the left front in a diagonal direction. FIG. 27 is a diagram illustrating a state of appearance of the image V20 when the display region DA1 of the liquid crystal display device 100 according to the fifth embodiment is seen in the normal direction passing through the center point of the display region DA1. FIG. 28 is a diagram illustrating a state of appearance of the image V20 when the display region DA1 of the liquid crystal display device 100 according to the fifth embodiment is seen from the right front in a diagonal direction.

As illustrated in FIGS. 26 to 28, even when the viewer sees the display region DA1 from any one direction of the left front, the front, and the right front, it is possible to further suppress reduction in contrast.

In this manner, the image enlargement processing unit **414*b*1 according to the fifth embodiment sets the predetermined enlargement center position in accordance with the position of the viewer (user) determined by the position determination unit 62. This can further control the degree of enlargement of the second image V22 in accordance with the position of the viewer (user), so that it is possible to suppress further reduction in contrast of the image V20**.

Note that in a case where the position determination unit 62 determines that there are two or more viewers (users), the position determination unit 62 does not perform the processing described in the fourth embodiment, that is, it does not generate the parameter P4, but the image enlargement processing unit **414*b*1 may generate the second image V22 without input of the parameter P4**, based on the predetermined enlargement center position.

Furthermore, the liquid crystal display device 100 according to the fifth embodiment may also include the input device 50 (FIGS. 18, 19) capable of inputting at least one of the parameter P1, the parameter P2, and the parameter P3, and may include the angle adjustment mechanism **121*a* (FIG. 21) that rotatably supports the display unit 120**.

Figure 29:
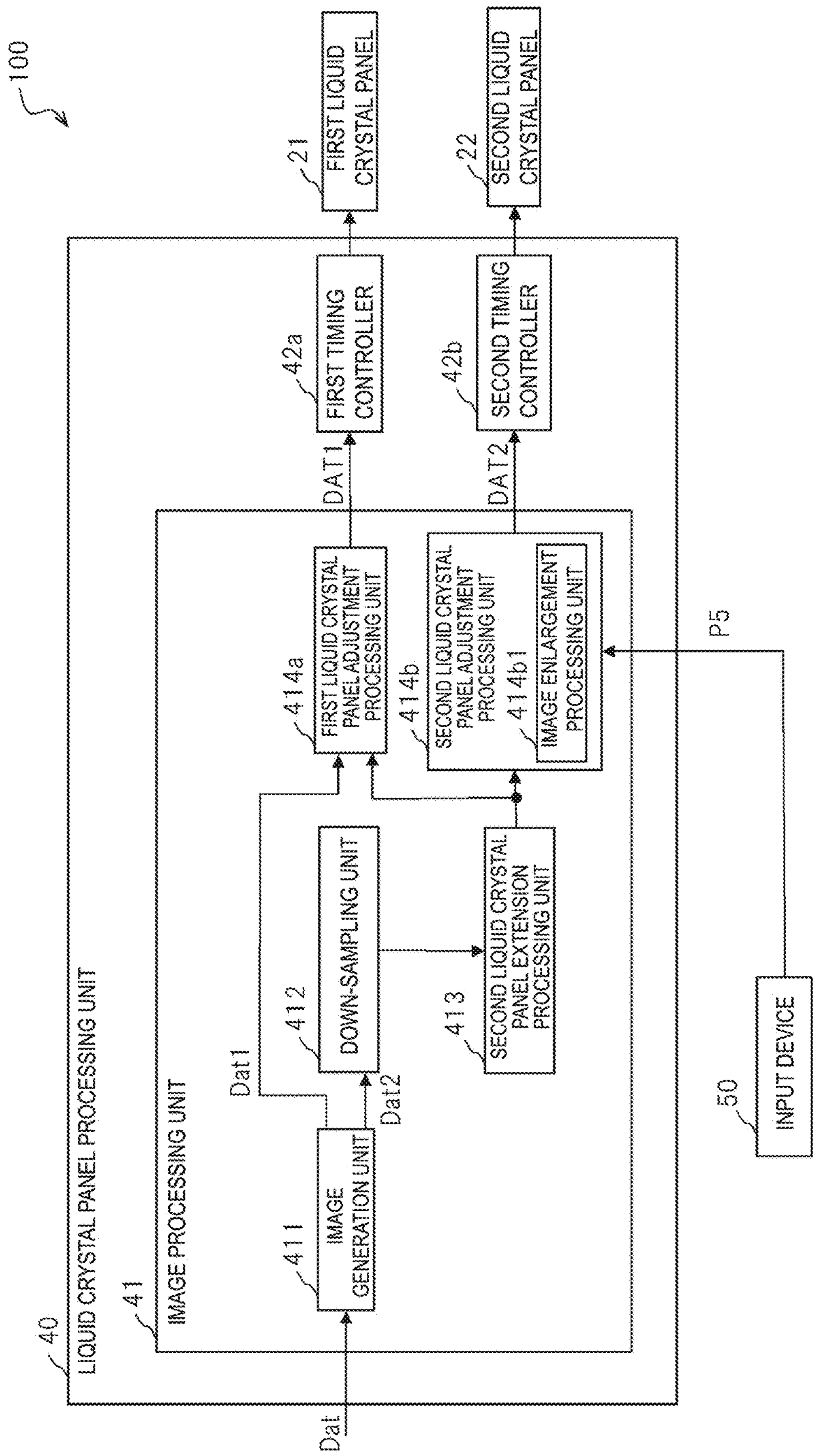
FIG. 29 is a block diagram schematically illustrating a liquid crystal display device according to a sixth embodiment.

FIG. 29 is a block diagram schematically illustrating a liquid crystal display device 100 according to a sixth embodiment. An input device 50 included in the liquid crystal display device 100 according to the sixth embodiment illustrated in FIG. 29 is a device capable of inputting a parameter (fifth parameter) P5. The parameter P5 is position information indicating a predetermined enlargement center position when the second liquid crystal panel adjustment processing unit **414*b* generates the second image V22. Note that the input device 50 included in the liquid crystal display device 100 according to the sixth embodiment may be for input of the parameter P5 in place of the parameter P1 and the parameter P2 or in addition to the parameter P1 and the parameter P2 that can be input by the input device 50 described with reference to FIG. 18. Alternatively, the input device 50 included in the liquid crystal display device 100 according to the sixth embodiment may be for input of the parameter P5 in place of the parameter P3 or in addition to the parameter P3 that can be input by the input device 50 described with reference to FIG. 19**.

In this manner, the image enlargement processing unit **414*b*1 according to the sixth embodiment sets a predetermined enlargement center position based on the position information indicated by the parameter P5 input by the input device 50, and enlarges the pre-enlargement image V20*a* to generate the second image V22. This can further control the degree of enlargement of the second image V22 in accordance with the position of the viewer (user), so that it is possible to suppress further reduction in contrast of the image V20**.

The disclosure is not limited to the embodiments described above, and may be substituted with a configuration that is substantially the same as the configuration described in the embodiments described above, a configuration that achieves the same action and effect, or a configuration capable of achieving the same object.

The invention claimed is:

1. A display device comprising:

a first liquid crystal panel configured to display a first image;

a second liquid crystal panel facing a rear surface of the first liquid crystal panel and configured to display a second image synchronized with the first image; and an image enlargement processing unit configured to generate the second image to be displayed on the second liquid crystal panel by enlarging a pre-enlargement image from a predetermined enlargement center position toward at least one end portion of the second liquid crystal panel, wherein the image enlargement processing unit enlarges the pre-enlargement image, being an image before an enlargement of the second image, in such a manner that a position of a pre-enlargement display element of the pre-enlargement image gets close to the at least one end portion to generate the second image, the pre-enlargement display element being a partial region closer to the at least one end portion than the predetermined enlargement center position.

2. The display device according to claim 1, wherein the image enlargement processing unit enlarges the pre-enlargement image, being the image before the enlargement of the second image, from the predetermined enlargement center position isotropically in both a horizontal direction and a vertical direction in a display region of the second liquid crystal panel to generate the second image.

3. The display device according to claim 1, further comprising:

an input device configured to input a parameter that includes information for adjusting a display position of the second image in a display region of the second liquid crystal panel.

4. The display device according to claim 1, further comprising:

an angle adjustment mechanism configured to adjust angles of the first liquid crystal panel and the second liquid crystal panel.

5. The display device according to claim 1, further comprising:

a position determination unit configured to determine a position of a viewer, wherein the image enlargement processing unit sets the predetermined enlargement center position in accordance with the position of the viewer determined by the position determination unit.

6. The display device according to claim 1, further comprising:

an input device configured to input position information indicating the predetermined enlargement center position, wherein the image enlargement processing unit sets the predetermined enlargement center position in accordance with a position input by the input device.

7. A display device comprising:

a first liquid crystal panel configured to display a first image;

a second liquid crystal panel facing a rear surface of the first liquid crystal panel and configured to display a second image synchronized with the first image;

an image enlargement processing unit configured to generate the second image to be displayed on the second liquid crystal panel by enlarging a pre-enlargement image from a predetermined enlargement center position toward at least one end portion of the second liquid crystal panel;

a liquid crystal panel extension processing unit configured to perform filtering to generate the pre-enlargement image, being an image before an enlargement of the second image, by the image enlargement processing unit; and an input device configured to input at least one of a first parameter and a second parameter, the first parameter including information for the liquid crystal panel extension processing unit to perform the filtering, and the second parameter including information for the image enlargement processing unit to enlarge the pre-enlargement image.

8. A display method comprising:

displaying a first image on a first liquid crystal panel;

displaying a second image synchronized with the first image on a second liquid crystal panel facing a rear surface of the first liquid crystal panel;

generating the second image by enlarging a pre-enlargement image from a predetermined enlargement center position in the second liquid crystal panel toward at least one end portion of the second liquid crystal panel; and enlarging the pre-enlargement image, being an image before an enlargement of the second image, in such a manner that a position of a pre-enlargement display element of the pre-enlargement image gets close to the at least one end portion to generate the second image, the pre-enlargement display element being a partial region closer to the at least one end portion than the predetermined enlargement center position.

* * * * *